(12) United States Patent
Yim et al.

(10) Patent No.: US 10,938,433 B2
(45) Date of Patent: Mar. 2, 2021

(54) MOBILE DEVICE MOUNTING APPARATUS

(71) Applicants: Young Chan Yim, Daejeon (KR); Sang Hee Kim, Daejeon (KR)

(72) Inventors: Young Chan Yim, Daejeon (KR); Sang Hee Kim, Daejeon (KR)

(73) Assignee: FIRST PENGUIN INC., Daejeon (KR)

( * ) Notice: Subject to any disclaimer, the term of this patent is extended or adjusted under 35 U.S.C. 154(b) by 0 days.

(21) Appl. No.: 16/647,431

(22) PCT Filed: Mar. 6, 2018

(86) PCT No.: PCT/KR2018/002641
§ 371 (c)(1),
(2) Date: Mar. 13, 2020

(87) PCT Pub. No.: WO2019/059473
PCT Pub. Date: Mar. 28, 2019

(65) Prior Publication Data
US 2020/0235770 A1     Jul. 23, 2020

(30) Foreign Application Priority Data

Sep. 21, 2017 (KR) .......... 10-2017-0122066
Dec. 7, 2017 (KR) .......... 10-2017-0167420

(51) Int. Cl.
*H04B 1/3888* (2015.01)
*A45F 5/00* (2006.01)
*H04B 1/3877* (2015.01)
*H04M 1/02* (2006.01)
*H04M 1/04* (2006.01)

(52) U.S. Cl.
CPC ............ *H04B 1/3888* (2013.01); *A45F 5/00* (2013.01); *H04B 1/3877* (2013.01); *H04M 1/026* (2013.01); *H04M 1/04* (2013.01); *A45F 2200/0516* (2013.01)

(58) Field of Classification Search
CPC ....... H04B 1/3888; H04B 1/3877; A45F 5/00; A45F 2200/0516; H04M 1/026; H04M 1/04
See application file for complete search history.

(56) References Cited

U.S. PATENT DOCUMENTS

| 10,581,480 | B1* | 3/2020 | Kim | .............. H04M 1/04 |
| 2016/0353867 | A1* | 12/2016 | Due | .............. A45F 5/00 |
| 2017/0104854 | A1* | 4/2017 | Park | .............. A45C 11/00 |
| 2018/0220782 | A1* | 8/2018 | Mody | .............. A45F 5/00 |

* cited by examiner

*Primary Examiner* — Nguyen T Vo

(57) ABSTRACT

A mobile device holder attached to the back surface of a mobile device is provided. More particularly, a mobile device holder is provided, whereby a mobile device can stand at a predetermined angle or be mounted at various positions according to user's surroundings.

8 Claims, 25 Drawing Sheets

MOBILE DEVICE MOUNTING APPARATUS

CROSS REFERENCE TO RELATED APPLICATION

The present application claims priority to Korean Patent Application No. 10-2017-0122066, filed Nov. 21, 2017 and Korean Patent Application No. 10-2017-0167420, filed Dec. 7, 2017, the entire contents of which is incorporated herein for all purposes by this reference.

BACKGROUND OF THE INVENTION

Field of the Invention

The present invention generally relates to a mobile device holder attached to the back surface of a mobile device. More particularly, the present invention relates to a mobile device holder, whereby a mobile device can stand at a predetermined angle or be mounted at various positions according to user's surroundings.

Description of the Related Art

With the development of communication technology, people who use service such as broadcasting or movie streaming, or wireless communication service such as making wireless calls or exchanging messages by using a mobile device such as a smart phone, a smart pad, a tablet computer, and a PDA while moving are increasing every year.

Such a mobile device has been positioned as one of the essential necessities for enjoying the convenience of life according to the development of the information industry, and accordingly, various auxiliary devices have been developed and commercialized so that the mobile device can be used more conveniently and effectively.

A mobile device holder of the auxiliary devices of the mobile device allows the mobile device to stand at a predetermined angle on a table to provide convenience to a user or to be fitted over the finger such that the mobile device is grasped stably, so that the mobile device is prevented from falling, thereby providing more convenience and efficiency when the mobile device is used.

Recently, a technology, in which a holder is integrally attached to the back surface of the mobile device to be used without the holder mounted to a bag or a pocket, has been proposed.

A technology in which a holder is attached to the back surface of the mobile device is disclosed in Korean Patent Nos. 10-1663817, 10-1316363, and 10-1357009, and Korean Patent Application Publication No. 10-2017-0116899.

However, when no table serving as a floor is provided, the conventional mobile device holder is difficult or impossible to be used. Accordingly, when a user mounts the mobile device while sitting in a seat of a vehicle or a room that is not equipped with a table, it is very inconvenient and its utility is low.

In addition, the holder using conventional technology, in which a ring part is fitted over the finger to be used, includes a plate attached to the back surface of the mobile device, a holding ring rotatably connected to the plate, and a connecting pin connecting the plate with the holding ring. When the holding ring is repeatedly used, rotation resistance of the holding ring is decreased and thus the replacement cycle of the holding ring is shortened, and durability thereof is drastically reduced due to friction between the connecting pin and the holding ring.

Accordingly, a mobile device holder is required to be developed, in which the reduction ratio of rotation resistance due to repeated use is reduced and durability is improved to be commonly used in various environments.

SUMMARY OF THE INVENTION

Accordingly, the present invention has been made keeping in mind the above problems occurring in the related art, and the present invention is intended to propose a mobile device holder, which allows a mobile device to be mounted in various positions such as a floor, the handle of a seat, and the upper end of a specific object to improve user convenience and has improved durability.

In order to achieve the above objective, according to one aspect of the present invention, there is provided a mobile device holder including: a base part 100 combined with a side of a mobile device or a case of the mobile device, and having a first hinge piece 101 provided at a side surface thereof by protruding therefrom; and a first holder 200 provided along a side surface of the base part 100, and each of opposite ends of which is connected to the hinge piece 101 such that the first holder is rotated, wherein a second hinge piece 201 is provided on a side surface of the first holder 200 by protruding therefrom, a second insertion hole 201-1 being provided in the second hinge piece by being formed therethrough.

In addition, the holder may further include: a second holder 300 connected to the second hinge piece 201 to rotate in the same direction as rotation of the first holder 200 and surrounding an outer surface of the first holder 200.

A first end of the second holder 300 may be connected to the second hinge piece 201 such that the second holder 300 surrounds only a portion of an outer surface of the first holder 200, and a second end of the second holder 300 may be spaced apart from the second hinge piece 201.

The holder of the present invention may further include: a first horizontal hinge shaft 400 inserted into any one of a 1-1 open end part 210 and a 1-2 open end part 220 of the first holder 200 being in contact with the first hinge piece 101, and passing through the hinge piece 101, and a second horizontal hinge shaft 500 inserted into a 2-1 open end part 310 of the second holder 300 being in contact with the second hinge piece 201 and passing through the second hinge piece 201, wherein an end part of each of the first and second horizontal hinge shafts 400 and 500 provided by extending to have a predetermined length may be configured to be a polygon, or a first side and a second side thereof may have a step to have diameters different from each other.

Meanwhile, according to another embodiment of the present invention, the holder may further include: the first horizontal hinge shaft 400 inserted into any one of the 1-1 open end part 210 and the 1-2 open end part 220 of the first holder 200 being in contact with the first hinge piece 101, and passing through the hinge piece 101, and the second horizontal hinge shaft 500 inserted into the 2-1 open end part 310 of the second holder 300 being in contact with the second hinge piece 201 and passing through the second hinge piece 201, wherein the end part of each of the first and second horizontal hinge shafts 400 and 500 provided by extending to have the predetermined length may have a portion removed at an edge thereof or have a third pressing friction tube 800 covering multiple corrugations provided at a circumferential surface thereof.

According to the present invention, the base part 100 may include: a base plate 110 fixed to the mobile device and having a rotation hole 110-1 provided at a center thereof; a horizontal rotating body 120 having the first hinge piece 101 provided at a side thereof, and having a rotation shaft 121 provided on a lower surface thereof and fitted into the rotation hole 110-1 such that the horizontal rotating body 120 rotates in a rotation direction of the rotation shaft intersecting with a rotation shaft of the first holder 200.

Furthermore, the holder may further include: a rotation resistant 102 provided between the base plate 110 and the horizontal rotating body 120, the rotation resistant providing rotation resistance to the horizontal rotating body 120 by pressing each of an inner upper surface of the base plate 110 and an inner lower surface of the horizontal rotating body 120.

In addition, the holder may further include: an adhesive part 111 provided on a surface of the base plate 110 facing the mobile device and having adhesive force, and a magnetic part 103 provided between the base plate 110 and the horizontal rotating body 120 and made of a magnetic material such that the horizontal rotating body 120 is attached to or removed from an external device having magnetic force.

The mobile device holder of the present invention allows a mobile device to be mounted in various positions such as the bottom of a table, the top of a seat, a handle, and the top of a golf bag, thereby improving user convenience.

In addition, according to the mobile device holder of the present invention, the horizontal rotating body is configured to be surrounded by the first holder and the second holder, so the horizontal rotating body, the first holder, and the second holder are maintained to be in close contact with the back surface of the mobile device while the mobile device is not in use, thereby improving portability of the mobile device. Furthermore, first and second pressing friction tubes are provided in the mobile device holder and apply the rotation resistance of at least a predetermined torque to the first holder and the second holder, thereby improving durability of the mobile device holder.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Hereinbelow, a mobile device holder according to a first embodiment of the present invention will be described in detail with reference to the accompanying drawings.

Figure 1:
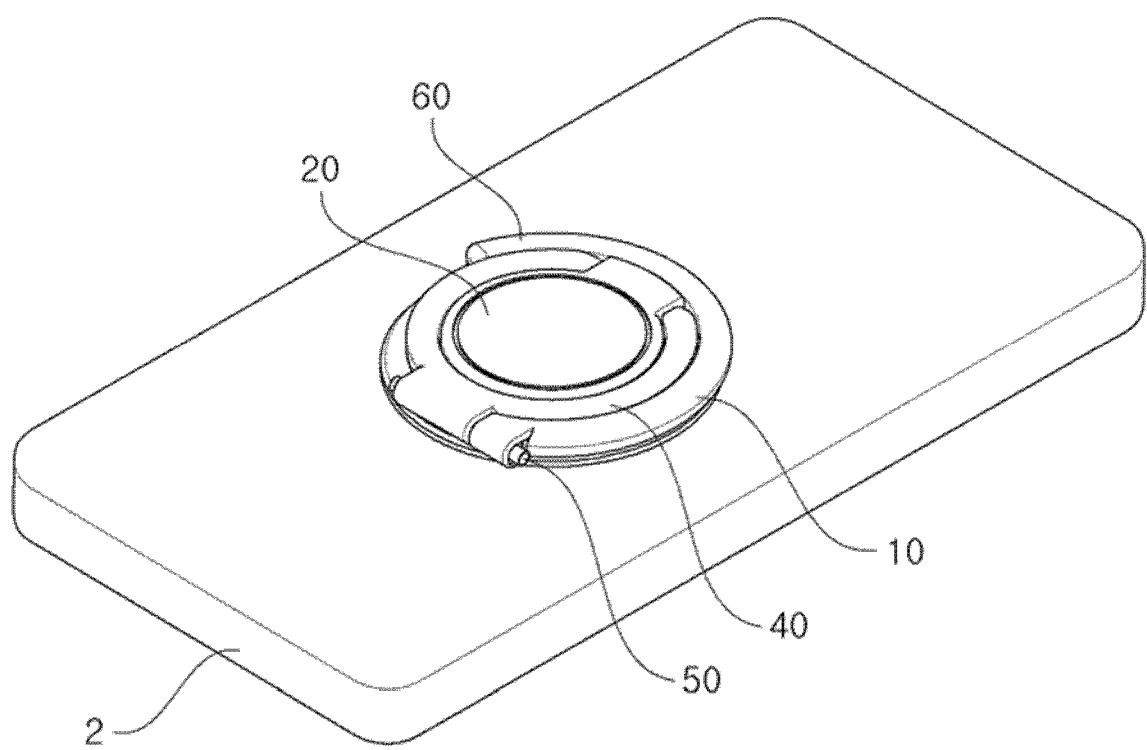
FIG. 1 is a perspective view illustrating a mobile device holder according to a first embodiment of the present invention.
Figure 2:
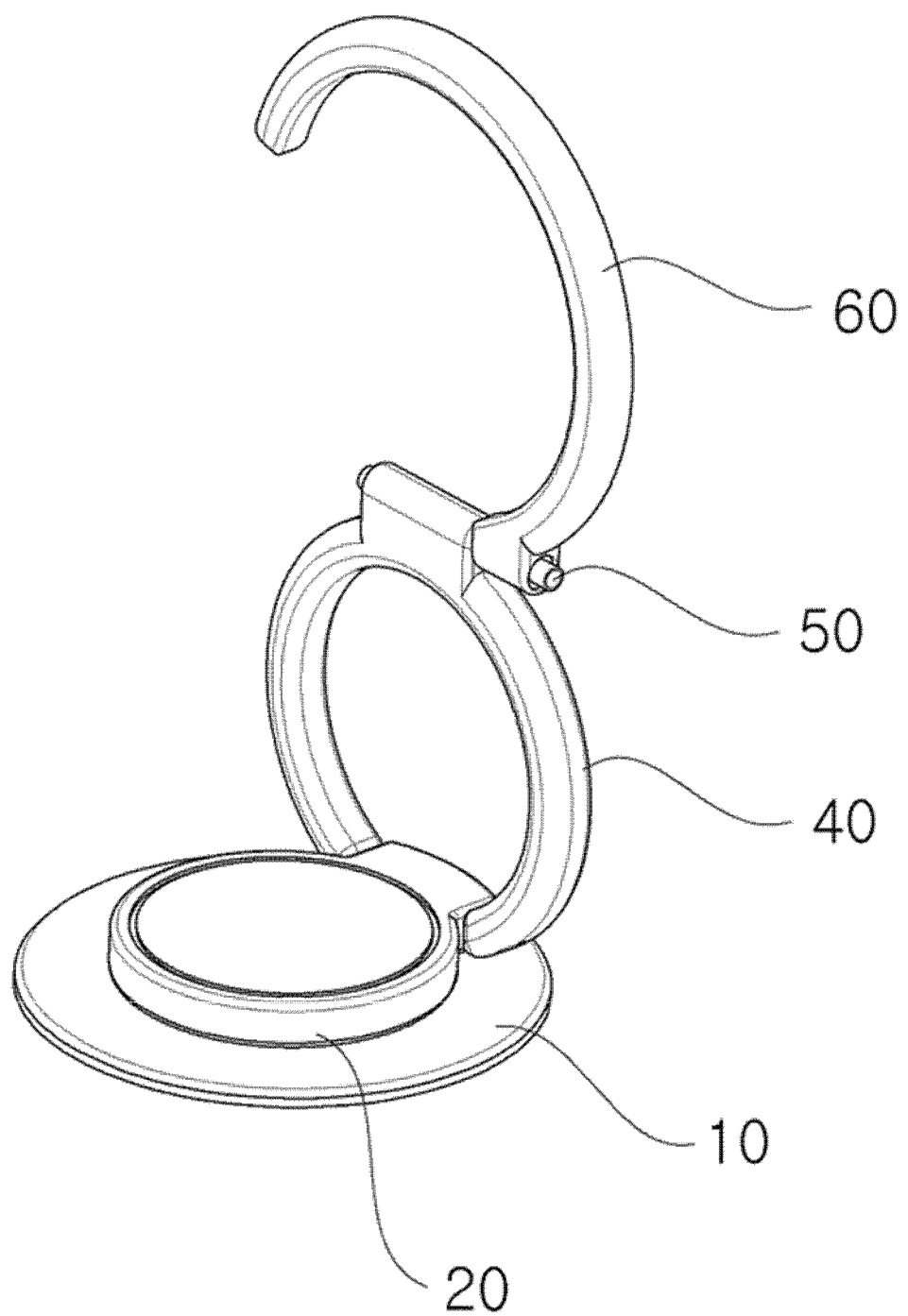
FIG. 2 is a perspective view illustrating operation state of the mobile device holder according to the first embodiment of the present invention.
Figure 3:
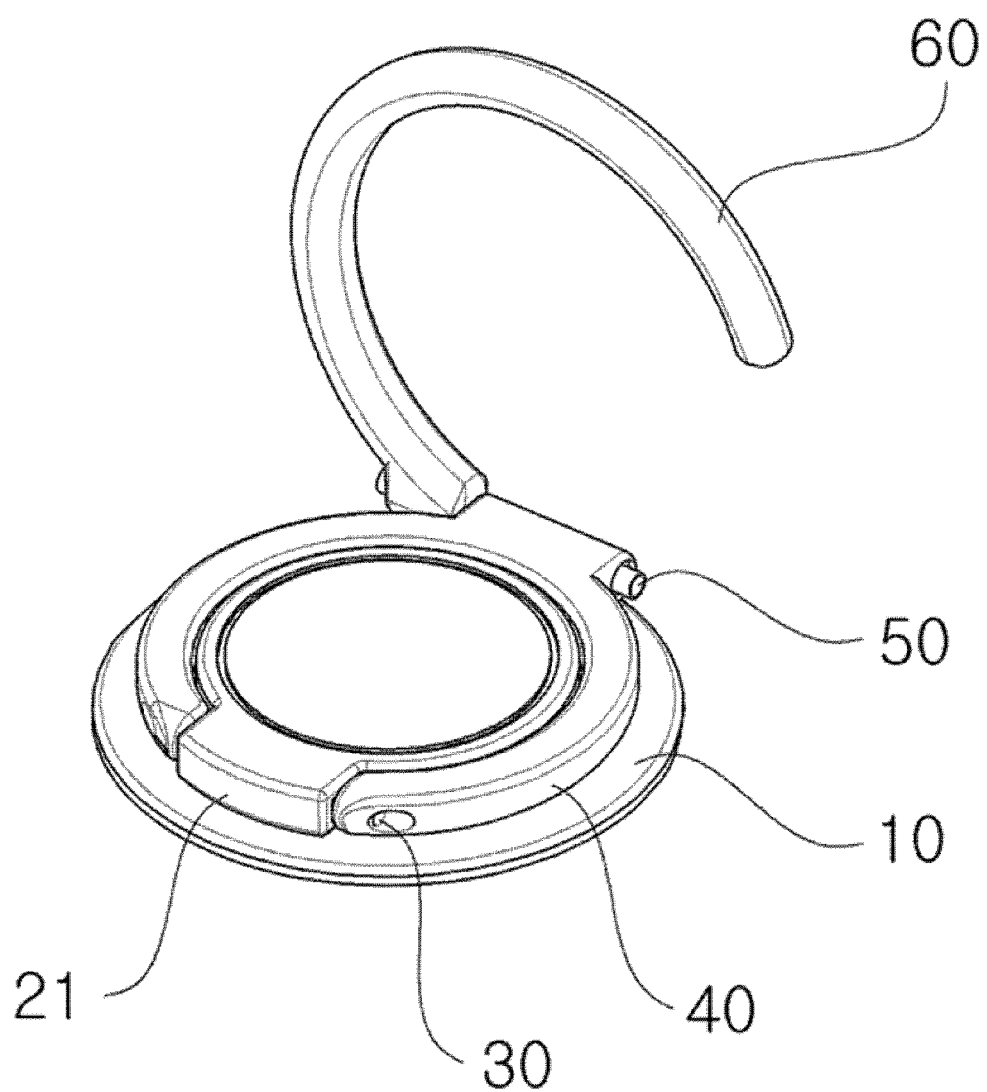
FIG. 3 is a perspective view illustrating another operation state of the mobile device holder according to the first embodiment of the present invention.
Figure 4:
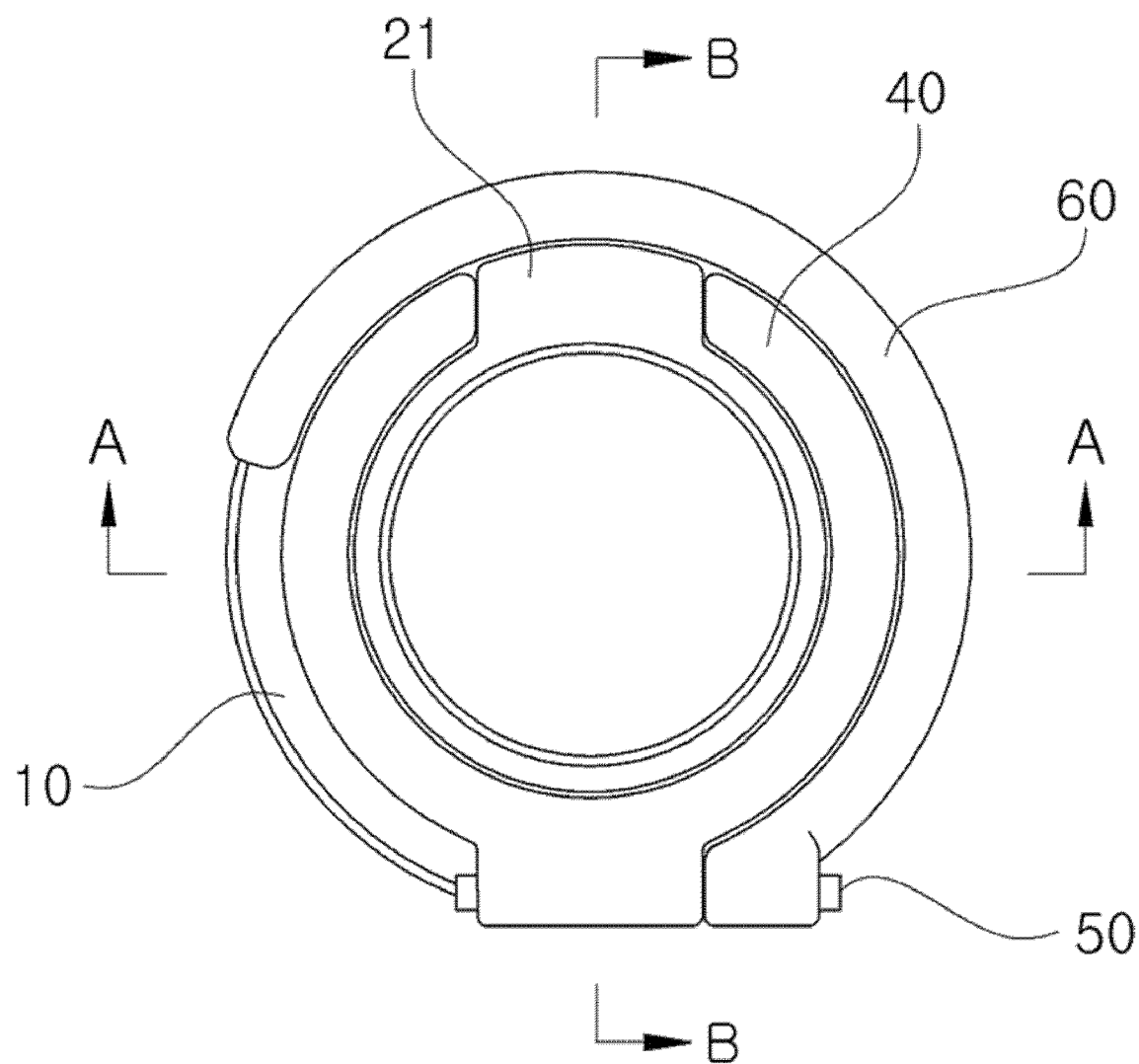
FIG. 4 is a top plan view illustrating the mobile device holder according to the first embodiment of the present invention.
Figure 5:
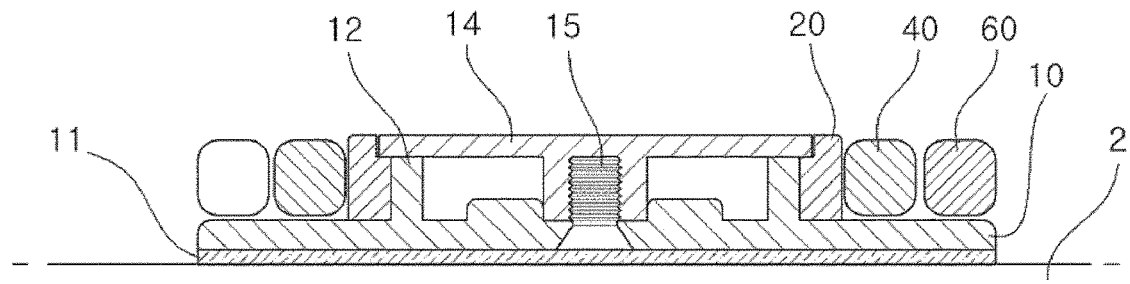
FIG. 5 is a sectional view taken along line A-A of FIG. 4.
Figure 6:
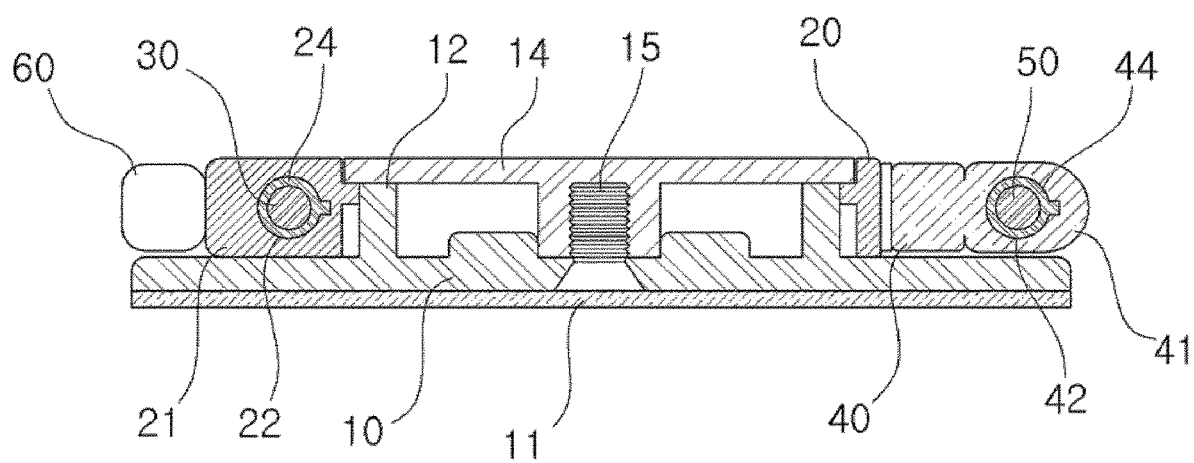
FIG. 6 is a sectional view taken along line B-B of FIG. 4.

As illustrated in FIGS. 5 and 6, a base plate 10 is attached to the back surface of a mobile device 2 by using an adhesive tape 11 provided at a surface of the base plate 10.

Although not shown in the drawings, the base plate 10 may be fastened to the mobile device 2 by using a screw. The base plate 10 includes a cylindrical center shaft 12 provided perpendicularly to the base plate 10 at a center thereof.

A locking plate 14 is provided at an end part of the center shaft 12 to prevent a horizontal rotating body 20 from being removed from the center shaft 12. The locking plate 14 is fastened to the base plate 10 by a fastening screw 15.

The horizontal rotating body 20 is configured to be a circular ring along an outer circumference of the center shaft 12, and is rotatably assembled with the outer circumference of the center shaft 12 therealong.

Figure 7:
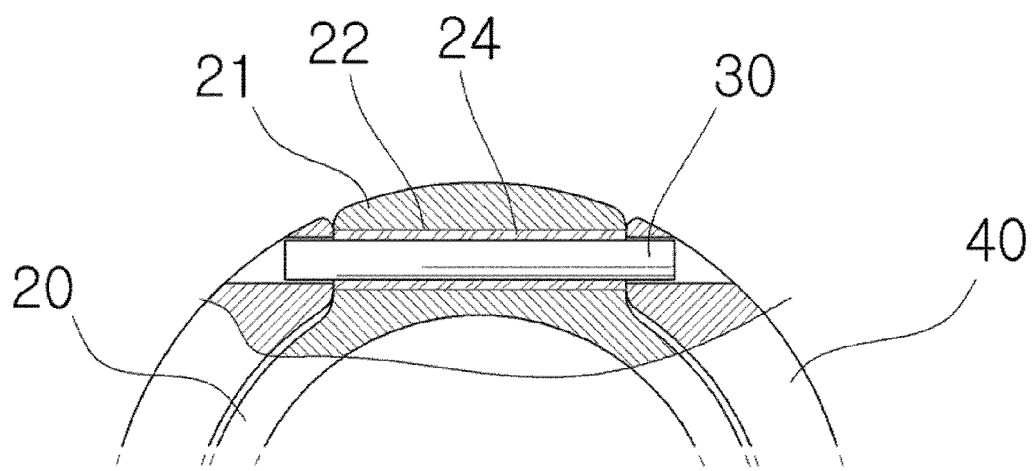
FIG. 7 is a partial sectional view of a horizontal rotating body and a first holder according to the first embodiment of the present invention.

As illustrated in FIGS. 6 and 7, the horizontal rotating body 20 includes a hinge piece 21 provided at a side thereof, and an assembly hole 22 formed in the hinge piece 21 such that a first horizontal hinge shaft 30 is inserted into the assembly hole 22. A first pressing friction tube 24 may be provided inside the assembly hole 22.

The first pressing friction tube 24 is configured to apply braking force to the first horizontal hinge shaft 30 due to friction between an inner surface of the first pressing friction tube 24 and an outer surface of the first horizontal hinge shaft 30 caused by pressing the first horizontal hinge shaft 30. Accordingly, the rotation of a first holder 40 can be stopped at a desired angle.

The first pressing friction tube 24 is formed to be a cylindrical pipe made of plastic, and a fixing protrusion 25 is formed at a side thereof such that the first pressing friction tube 24 is not rotated while inserted into the assembly hole 22, so that the first pressing friction tube 24 is fixed inside the assembly hole 22. When poly-oxy-methylene (POM) is used as a material of the first pressing friction tube 24, the first pressing friction tube 24 is excellent in strength, wear resistance, and elasticity, and realizes desired surface friction with the first horizontal hinge shaft 30.

Figure 9:
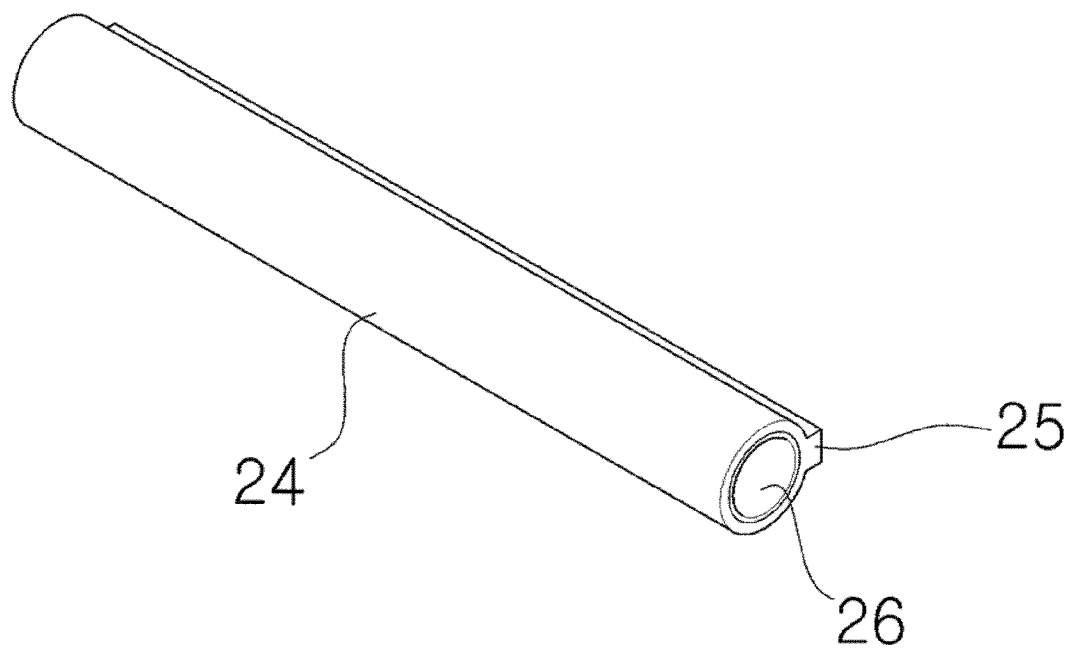
FIG. 9 is a perspective view illustrating a first pressing friction tube according to the first embodiment of the present invention.

Meanwhile, the first pressing friction tube 24 may be made of copper and include a rubber layer 26 on an inner surface thereof to increase the surface friction as illustrated in FIG. 9.

Figure 10:
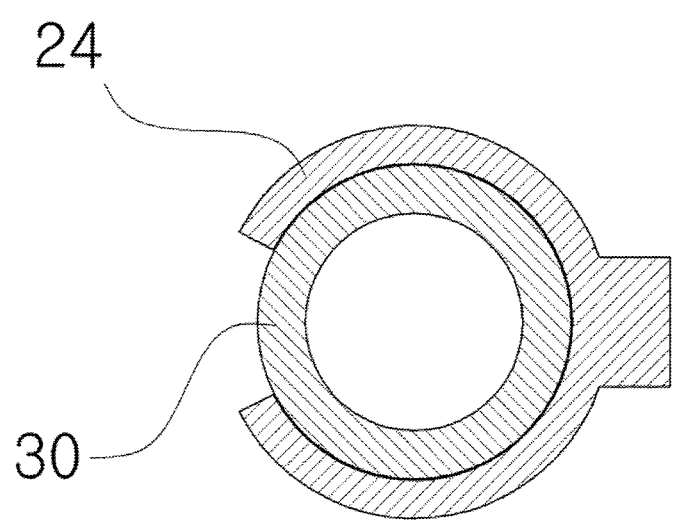
FIG. 10 is a sectional view illustrating the first pressing friction tube according to the first embodiment of the present invention.

As illustrated in FIG. 10, the first pressing friction tube 24 may be formed to be a pipe made of spring steel and having the section of a "C" shape such that friction between the first pressing friction tube 24 and the first horizontal hinge shaft 30 is increased since the first horizontal hinge shaft 30 is strongly pressed by elasticity of the first pressing friction tube 24 when the first horizontal hinge shaft 30 is inserted into the first pressing friction tube 24. The first holder 40 is configured in the shape of surrounding the horizontal rotating body 20. For example, the first holder 40 may be configured to be a circular ring. Although now shown, the first holder 40 may be configured to be a polygonal ring or an elliptical ring such as a triangle, a rectangle, or a pentagon.

Figure 8:
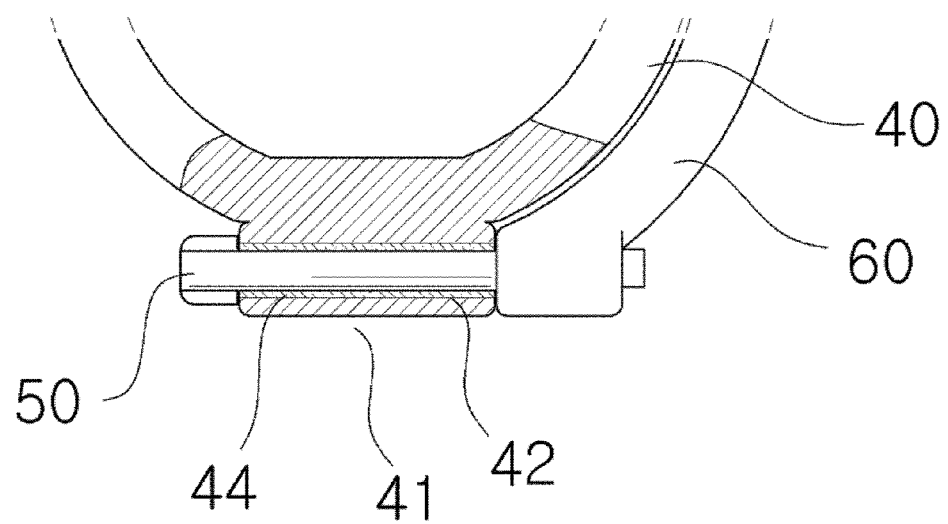
FIG. 8 is a partial sectional view of the first holder and a second holder according to the first embodiment of the present invention.

As illustrated in FIGS. 6 and 8, the first holder 40 includes the first horizontal hinge shaft 30 provided integrally thereto at a first side thereof, and a hinge piece 41 provided at a second side thereof. The hinge piece 41 includes an assembly hole 42 provided therein such that a second horizontal hinge shaft 50 rotates in the assembly hole 42. A second pressing friction tube 44 may be provided inside the assembly hole 42.

The second pressing friction tube 44 is configured to apply braking force to the second horizontal hinge shaft 50 due to friction between the second pressing friction tube 44 and the second horizontal hinge shaft 50 caused by pressing the second horizontal hinge shaft 50. Accordingly, the rotation of a second holder 60 can be stopped at a desired angle. The second pressing friction tube 44 is fixed inside the assembly hole 42.

The second pressing friction tube 44 can be embodied in the same configuration as the configuration of the first pressing friction tube 24 except for the above-described configuration, so detailed descriptions on the second pressing friction tube 44 will be omitted. The second holder 60 includes the second horizontal hinge shaft 50 provided integrally thereto at an end part thereof. The second holder 60 is configured to be a ring open at a side thereof, and is provided along a circumference of the first holder 40.

For example, the second holder 60 may be configured to be a ring having a "C" shape.

Next, the mobile device holder having the above-described configuration according to the first embodiment of the present invention will be described with reference to the drawings.

The mobile device holder according to the first embodiment of the present invention uses various objects present in a place to be used as well as a floor such that a front surface of the mobile device is placed toward a user.

Figure 11:
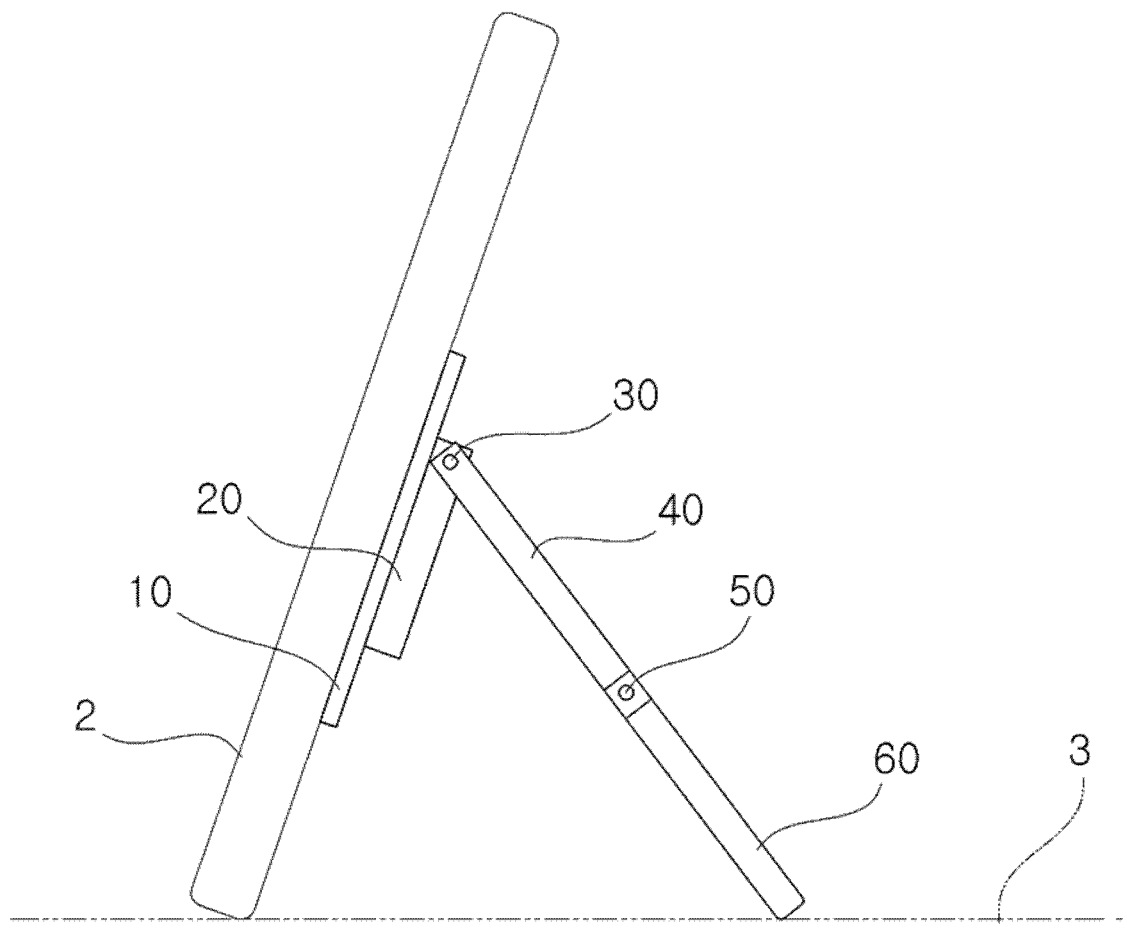
FIG. 11 is a view illustrating a first example of the mobile device holder of the present invention.
Figure 12:
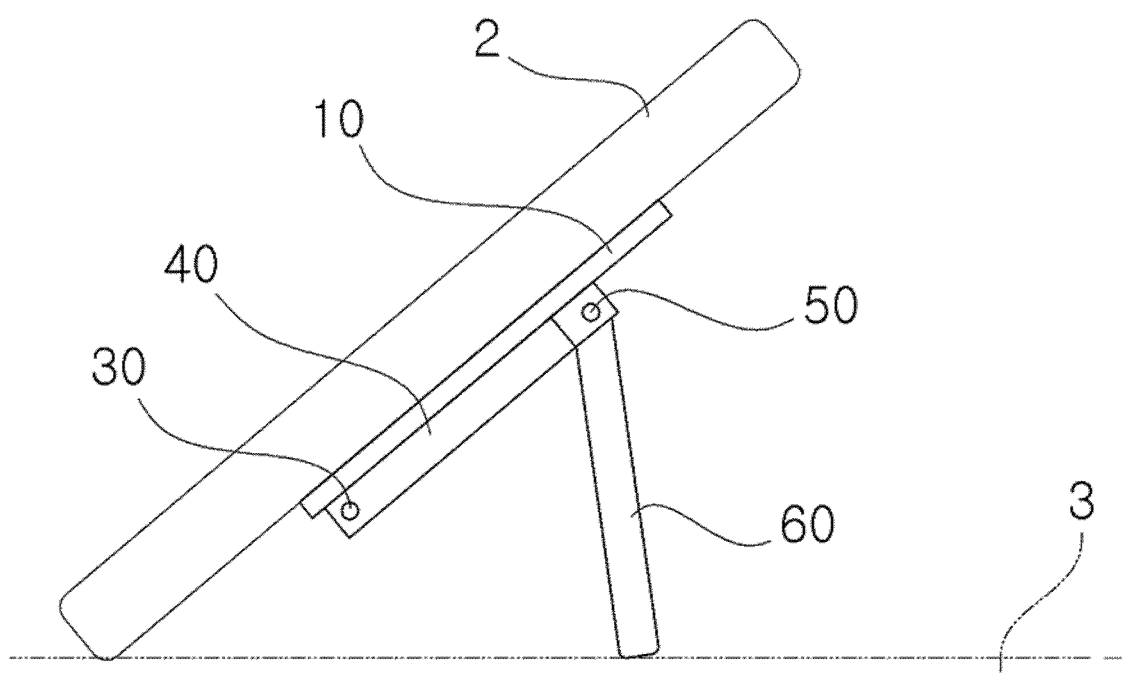
FIG. 12 is a view illustrating a second example of the mobile device holder of the present invention.

For example, as illustrated in FIGS. 11 and 12, in the mobile device holder according to the first embodiment of the present invention, the first holder 40 and the second holder 60 act as a support, or the second holder 60 alone acts as a support so that the mobile device 2 stands at a predetermined angle on the top 3 of a table.

Figure 13:
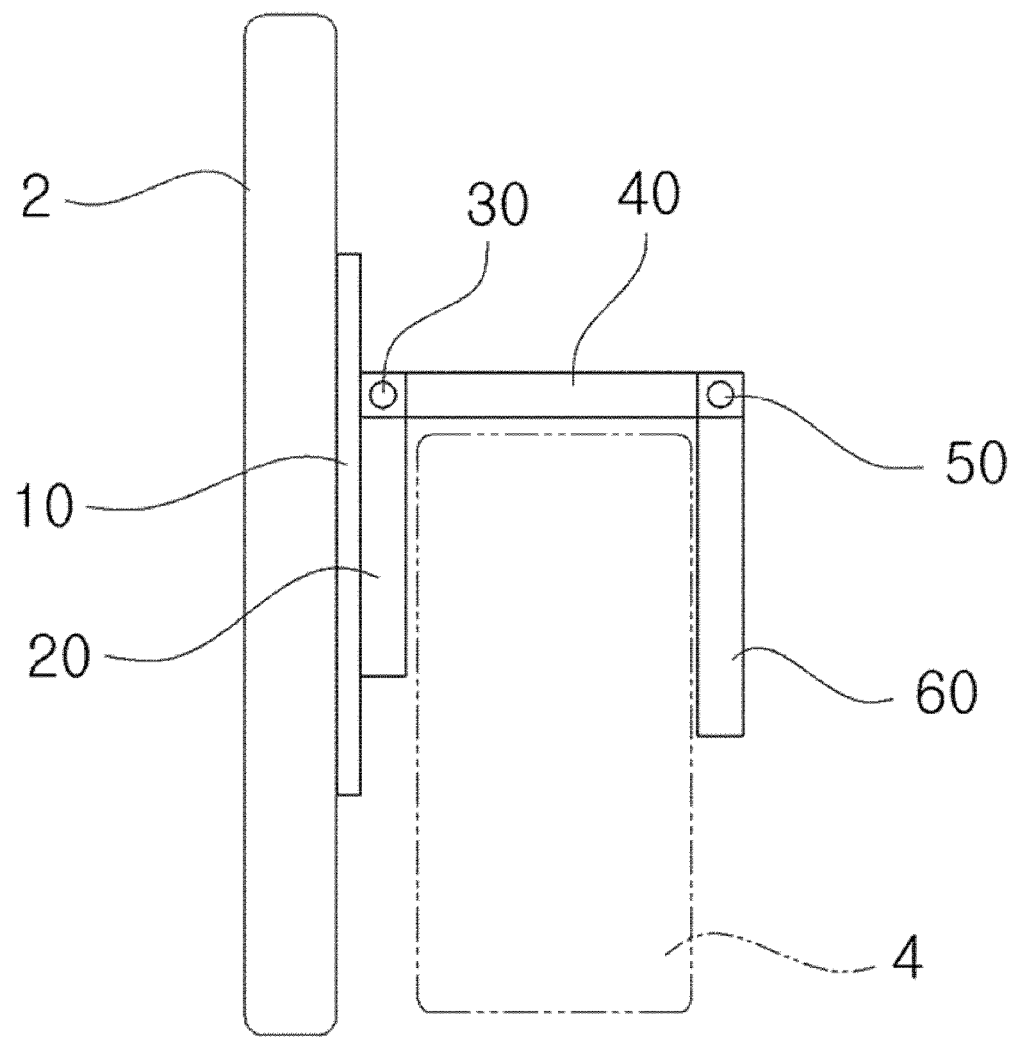
FIG. 13 is a view illustrating a third example of the mobile device holder of the present invention.
Figure 14:
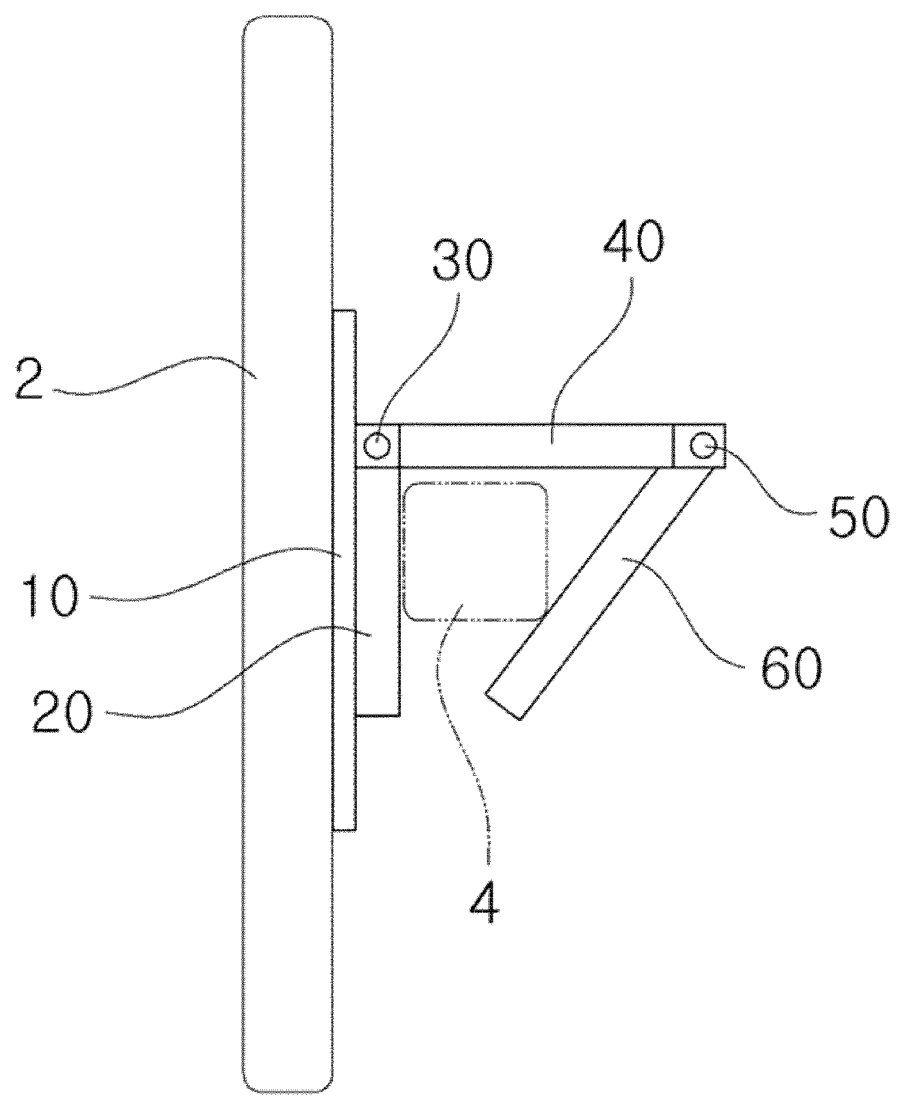
FIG. 14 is a view illustrating a fourth example of the mobile device holder of the present invention.

In addition, for example, as illustrated in FIGS. 13 and 14, the mobile device holder according to the first embodiment of the present invention may be configured to grasp an object 4 such as a handle provided in a seat such that the mobile device 2 is held.

Figure 15:
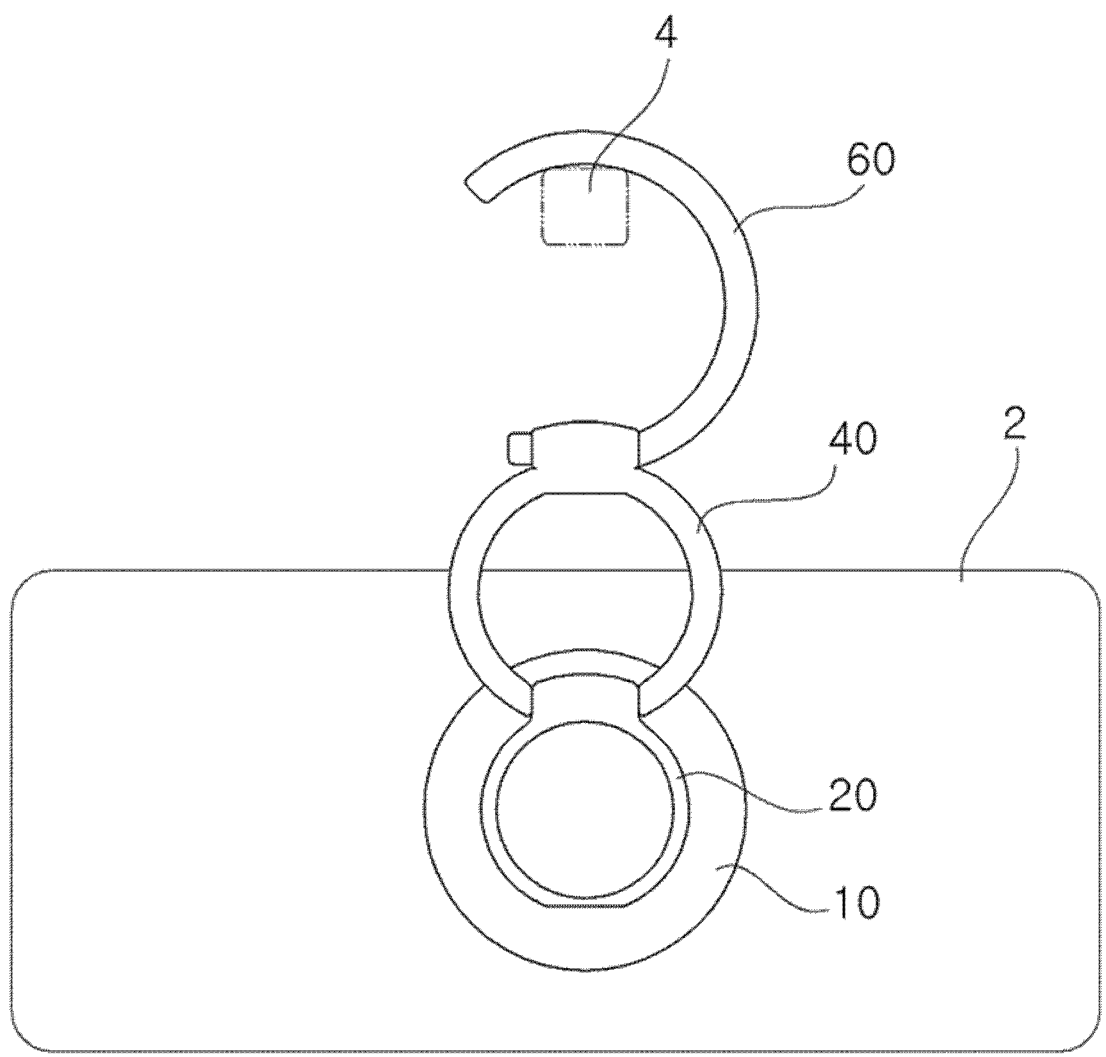
FIG. 15 is a view illustrating a fifth example of the mobile device holder of the present invention.
Figure 16:
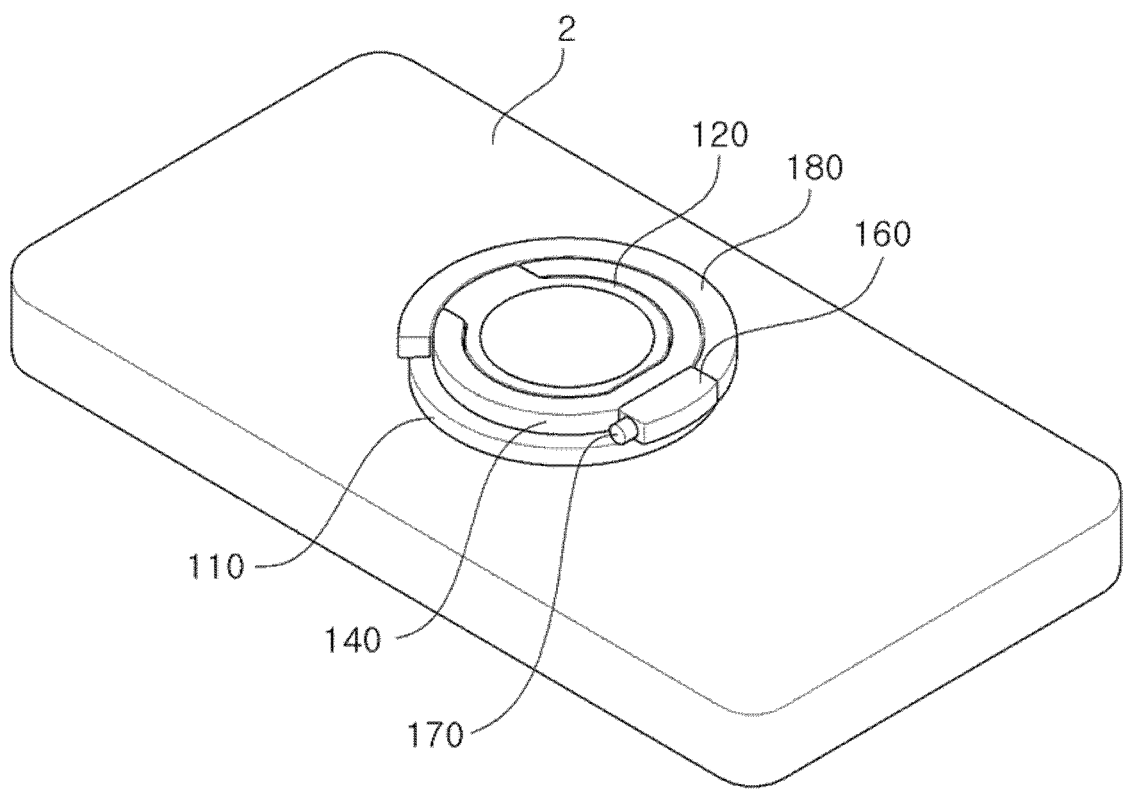
FIG. 16 is a perspective view illustrating a second embodiment of the mobile device holder of the present invention.
Figure 17:
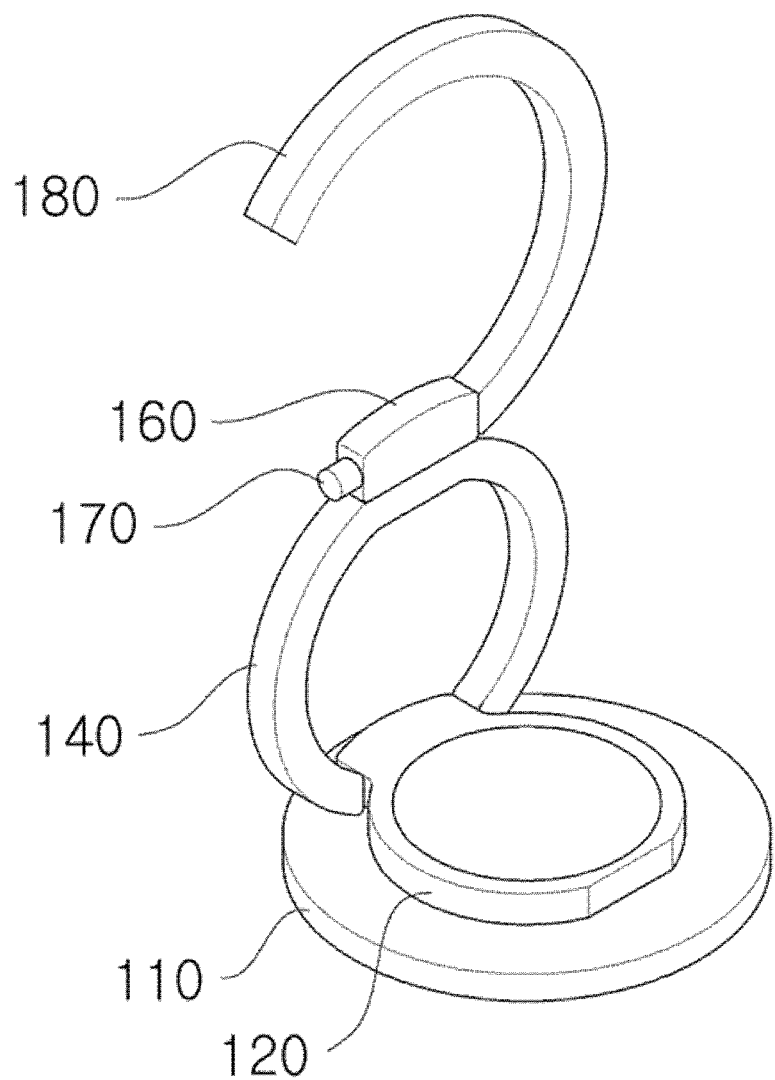
FIG. 17 is a perspective view illustrating operation state of the mobile device holder according to the second embodiment of the present invention.
Figure 18:
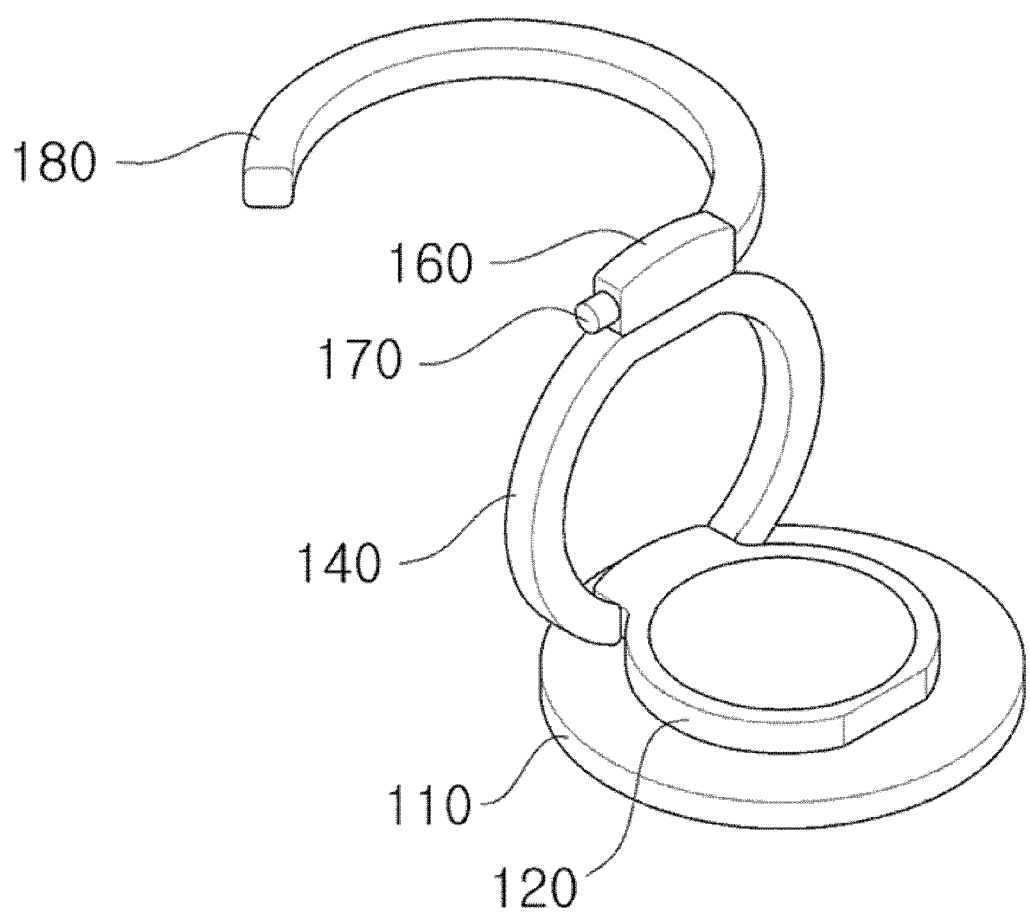
FIG. 18 is a perspective view illustrating another operation state of the mobile device holder according to the second embodiment of the present invention.
Figure 19:
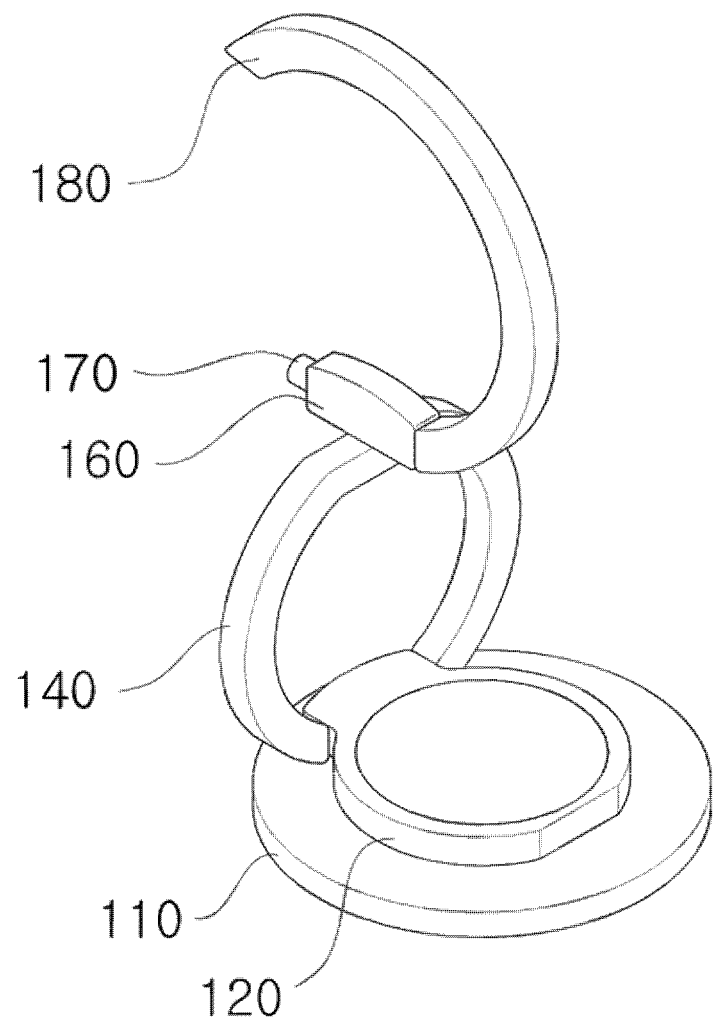
FIG. 19 is a perspective view illustrating still another operation state of the mobile device holder according to the second embodiment of the present invention.

Furthermore, for example, as illustrated in FIG. 15, the mobile device holder according to the first embodiment of the present invention allows the second holder 60 to be hung on an object 4 such as a handle or shelf such that the mobile device 2 is held.

In addition, as illustrated in FIGS. 16 to 20, the mobile device holder according to a second embodiment of the present invention includes a base plate 110 fixed to the mobile device 2, a horizontal rotating body 120 combined with the base plate 110 to rotate horizontally thereto, a first holder 140 rotatably combined with the horizontal rotating body 120 by using a first horizontal hinge shaft 130 horizontal to the base plate 110, a vertical rotating body 160 rotatably combined with the first holder 140 by using a vertical hinge shaft 150, which is horizontal to the base plate 110 and is perpendicular to the first horizontal hinge shaft 130, and a second holder 180 rotatably combined with the vertical rotating body 160 by using a second horizontal hinge shaft 170, which is configured in the shape of a ring, is horizontal to the base plate 110, and is perpendicular to the vertical hinge shaft 150.

Figure 21:
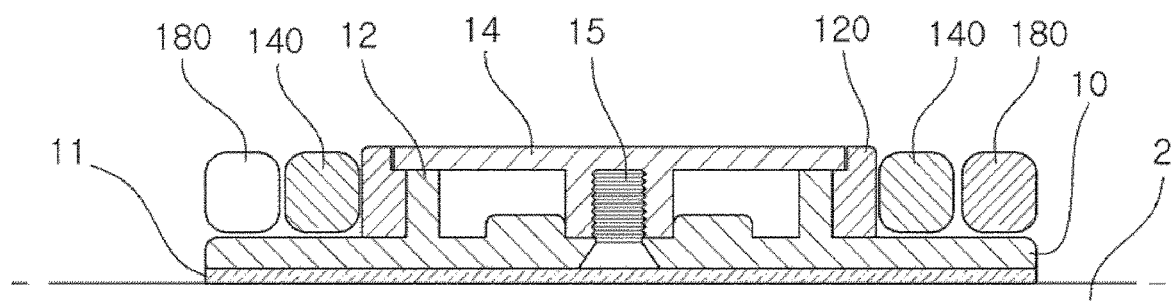
FIG. 21 is a sectional view taken along line C-C of FIG. 20.
Figure 22:
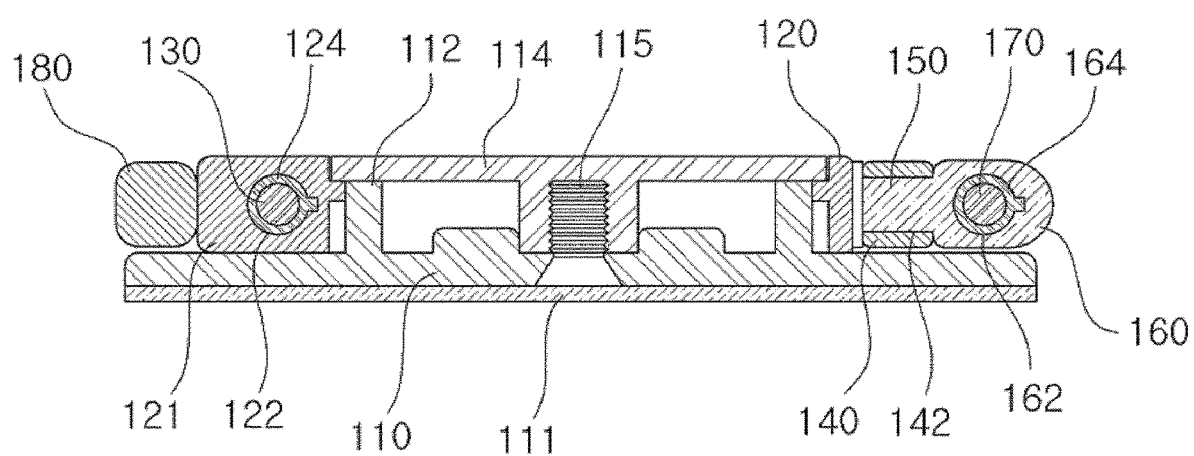
FIG. 22 is a sectional view taken along line D-D of FIG. 20.

As illustrated in FIGS. 21 and 22, a surface of the base plate 110 is attached to the back surface of the mobile device 2, and an adhesive part 111 may be provided between the mobile device 2 and the surface of the base plate 110. Furthermore, the base plate 110 may be fixed to the mobile device 2 by using screws.

The base plate 110 includes a cylindrical center shaft 112 provided perpendicularly thereto at a center thereof. A locking plate 114 is provided on an end part of the center shaft 112 to prevent the horizontal rotating body 120 from being removed from the center shaft 112.

The locking plate 114 is fastened to the base plate 110 by a fastening screw. The horizontal rotating body 120 is configured to be a circular ring along an outer circumference of the center shaft 112, and is rotatably assembled with the outer circumference of the center shaft 112 therealong.

Figure 20:
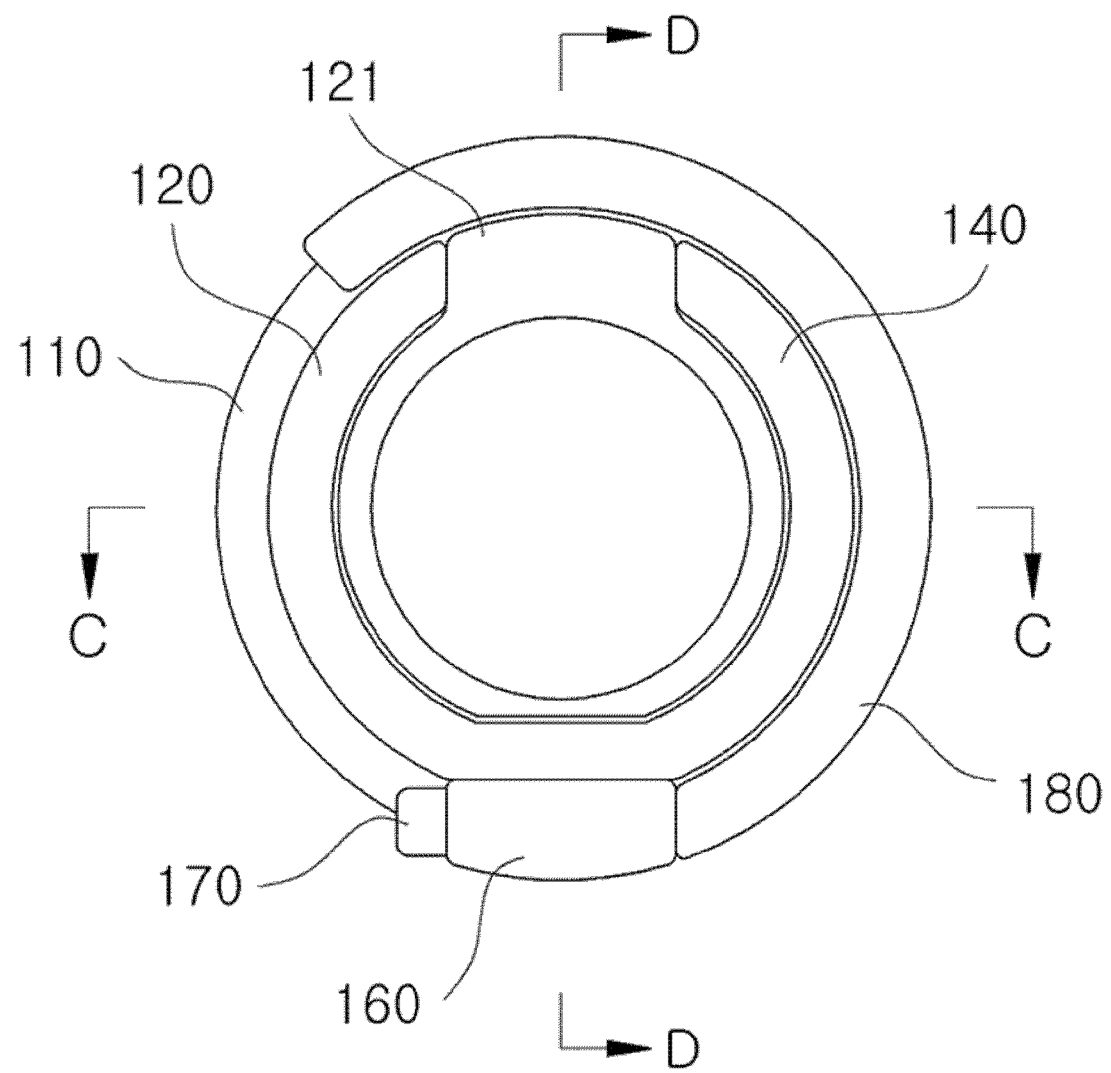
FIG. 20 is a top plan view illustrating the mobile device holder according to the second embodiment of the present invention.

As illustrated in FIGS. 20 and 22, the horizontal rotating body 120 includes a hinge piece 121 provided at a side thereof, and an assembly hole 122 formed in the hinge piece 121 such that the first horizontal hinge shaft 130 rotates in the assembly hole 122. A first pressing friction tube 124 may be provided inside the assembly hole 122.

The first pressing friction tube 124 is configured to apply braking force to the first horizontal hinge shaft 130 due to friction between the first pressing friction tube 124 and the first horizontal hinge shaft 130 caused by pressing the first horizontal hinge shaft 130. Accordingly, the rotation of the first holder 140 can be stopped at a desired angle.

The first pressing friction tube 124 is fixed inside the assembly hole 122. The first pressing friction tube 124 can be embodied in the same configuration as the configuration of the first pressing friction tube 24 of the first embodiment described above, so detailed descriptions on the first pressing friction tube 124 will be omitted.

The first holder 140 is configured in the shape of surrounding the horizontal rotating body 120. For example, the first holder 140 may be configured to be a circular ring. Although not shown, the first holder 140 may be configured to be a polygonal ring or an elliptical ring such as a triangle, a rectangle, or a pentagon.

Figure 23:
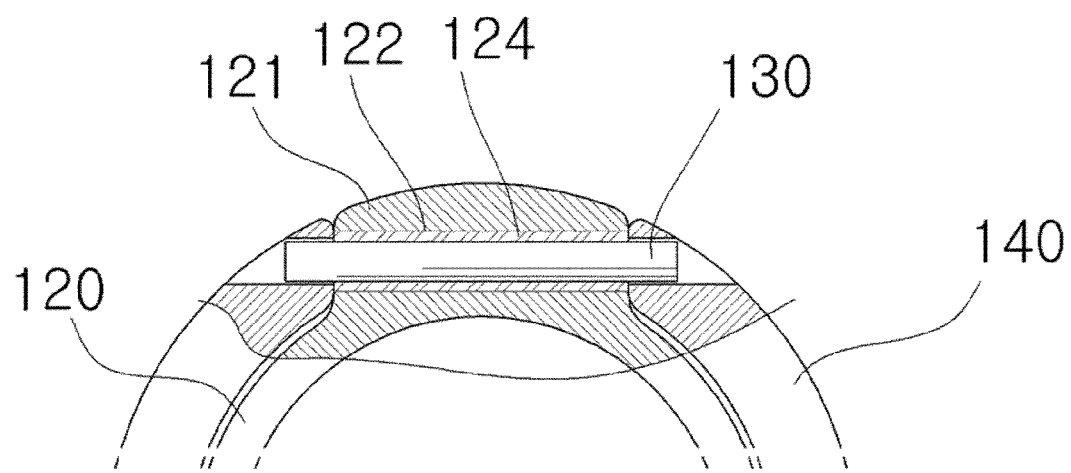
FIG. 23 is a partial sectional view illustrating the combined state of a horizontal rotating body and a first holder according to the second embodiment of the present invention.
Figure 24:
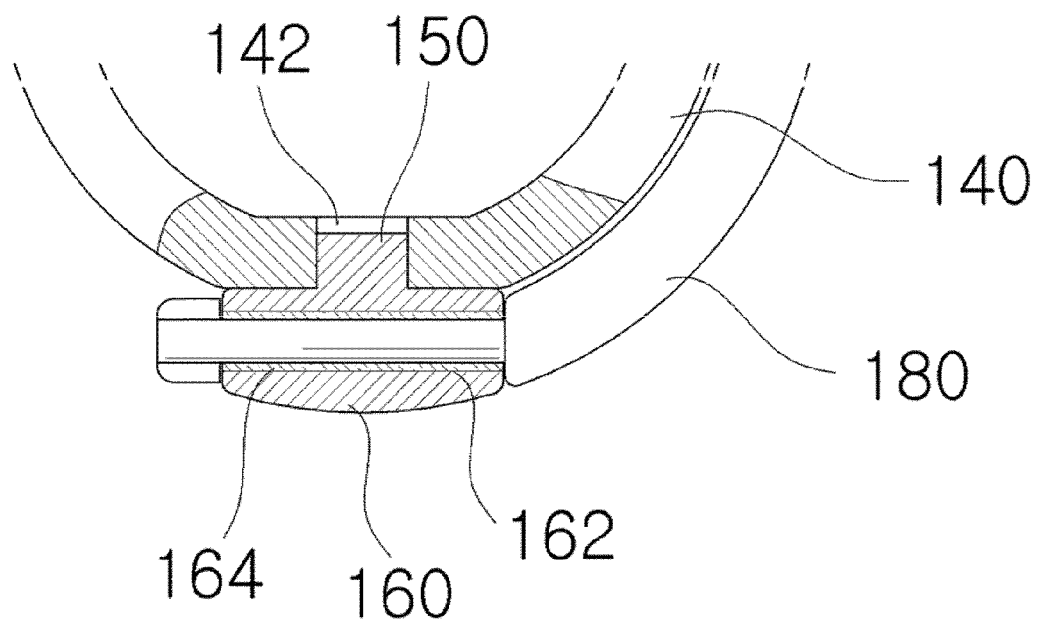
FIG. 24 is a partial sectional view illustrating the combined state of the first holder and a second holder according to the second embodiment of the present invention.

As illustrated in FIGS. 23 and 24, the first holder 140 includes the first horizontal hinge shaft 130 integrally provided at a first side thereof and a vertical hinge hole 142 provided at a second side thereof such that the vertical hinge shaft 150 is rotatably inserted into the vertical hinge hole 142. The mobile device holder according to the second embodiment of the present invention will be described in detail. The mobile device holder of the present invention includes a base part 100 and a first holder 200.

As illustrated in FIGS. 20 and 22, the vertical rotating body 160 includes an assembly hole 162 therein such that the second horizontal hinge shaft 170 is rotated in the assembly hole 162, and the vertical hinge shaft 150 integrally provided at a side thereof.

A second pressing friction tube 164 may be provided inside the assembly hole 162.

The second pressing friction tube 164 is configured to apply braking force to the second horizontal hinge shaft 170 due to friction between the second pressing friction tube 164 and the second horizontal hinge shaft 170 caused by pressing the second horizontal hinge shaft 170. Accordingly, the rotation of the second holder 180 can be stopped at a desired angle.

The second pressing friction tube 164 is fixed inside the assembly hole 162, and can be embodied in the same configuration as the configuration of the first pressing friction tube 124, so detailed descriptions of the second pressing friction tube 164 will be omitted.

The second holder 180 includes the second horizontal hinge shaft 170 integrally provided at an end part thereof. The second holder 180 is configured to be a ring open at a side thereof, and is provided along a circumference of the first holder 140.

For example, the second holder 180 may be formed to be a ring having a "C" shape.

Next, an example of the mobile device holder having the above-described configuration according to the second embodiment of the present invention will be described with reference to the drawings.

The mobile device holder according to the second embodiment described above can be mounted to various objects including various examples of the above embodiment.

Figure 25:
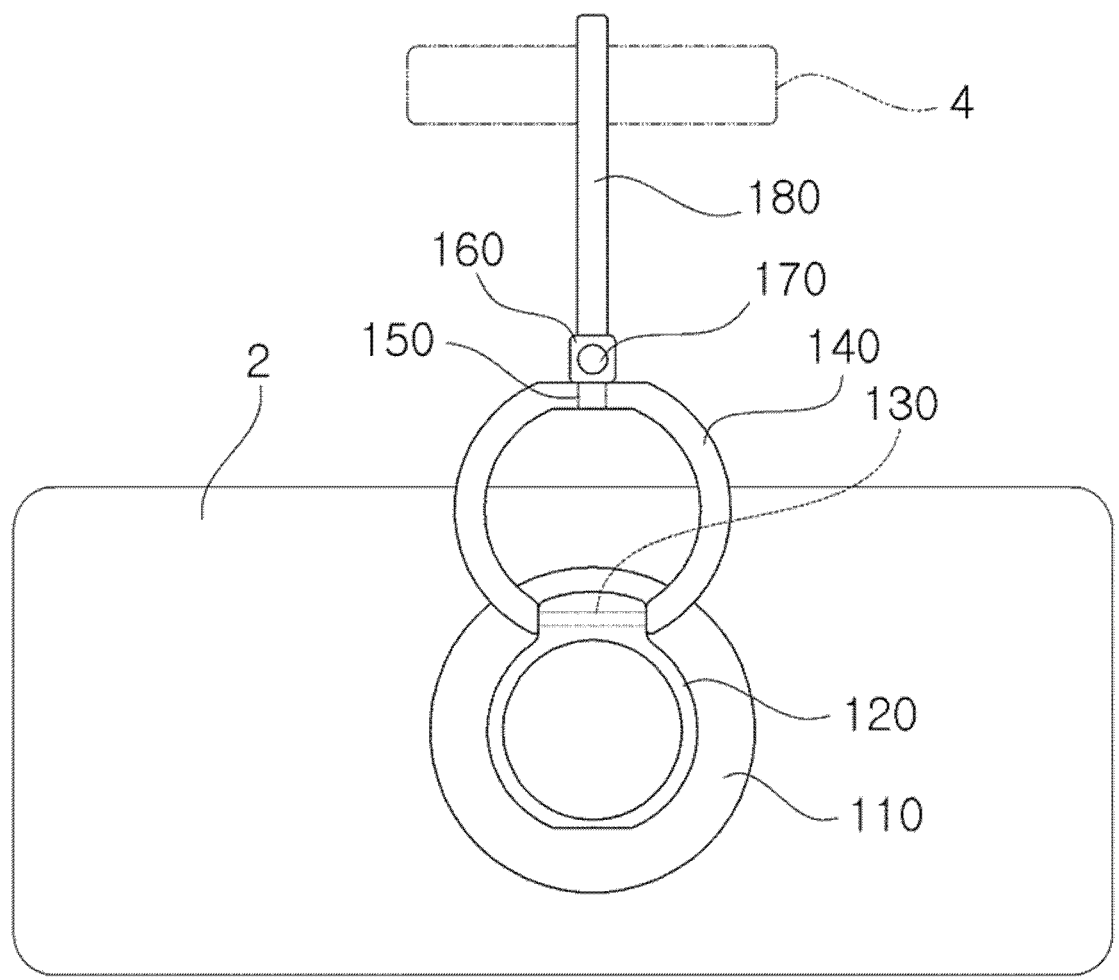
FIG. 25 is a view illustrating an example of the mobile device holder according to the second embodiment of the present invention.

For example, as illustrated in FIG. 25, in the mobile device holder according to the second embodiment of the present invention, the vertical rotating body 160 and the second holder 180 rotate relative to the vertical hinge shaft 150. Accordingly, a mobile device can be hung on objects 4 of various shapes and be used while being rotated in various directions.

A mobile device holder according to a third embodiment of the present invention will be described in detail referring to FIGS. 26 and 27. The mobile device holder of the present invention includes the base part 100 and the first holder 200.

The base part 100 is configured in the shape of a circular plate having a predetermined thickness, and a surface thereof may be attached to and combined with a back surface of the mobile device or a back surface of an external case of the mobile device. A first hinge piece 101 is provided at a side surface of the base part 100 by protruding therefrom, and a first insertion hole 101-1 is provided in the first hinge piece 101 by being formed therethrough.

The first holder 200 is provided along a side surface of the base part 100, and is configured in the shape of a ring having the same diameter as, or preferably a diameter larger than an outer diameter of the base part 100. The first holder 200 is configured in the shape of an open loop open at a side thereof, and each of opposite ends thereof may be connected to the first hinge piece 101 such that the first holder 200 rotates. The first holder 200 is combined with the first hinge piece 101, so the first holder 200 may have the shape of a closed loop. A second hinge piece 201 is provided on a side surface of the first holder 200 by protruding therefrom. The second hinge piece 201 is symmetrical with the first hinge piece 101 and is preferably formed in a position opposite thereto. A second insertion hole 201-1 may be provided in the second hinge piece 201 by being formed therethrough.

Referring to FIGS. 26, 27A, 27B, 27C, and 27D, a second holder 300 is provided by being connected to the second hinge piece 201 to be rotatable in the same direction as the first holder 200 and surrounds an outer surface of the first holder 200. The second holder 300 is configured in the shape of a ring, and has the shape of an open loop having the same diameter as or a diameter larger than an outer diameter of the first holder 200.

In addition, the second holder 300 is rotatably connected to the second hinge piece 201 at a first end thereof, and is configured in the shape of a ring surrounding only a portion of an outer surface of the first holder 200 along an outer edge thereof. That is, the first end of the second holder 300 is connected to the second hinge piece 201 and a second end of the second holder 300 is maintained to be spaced apart from the first end.

Accordingly, the second end of the second holder 300 can be hung on a specific portion (a bag, clothes, or chair, etc.) or sat on a table, thereby providing a user with the advantage of hanging a mobile device on a specific object or location in a range in which the mobile device can stand.

Meanwhile, the second hinge piece 201 is connected to the first holder 200 to rotate in a direction intersecting with the rotation direction of the second holder 300. Accordingly, the second holder 300 rotates freely in up, down, left, and right directions and is not restricted by the shape and location of the object to hold the second holder 300 on.

Figure 26:
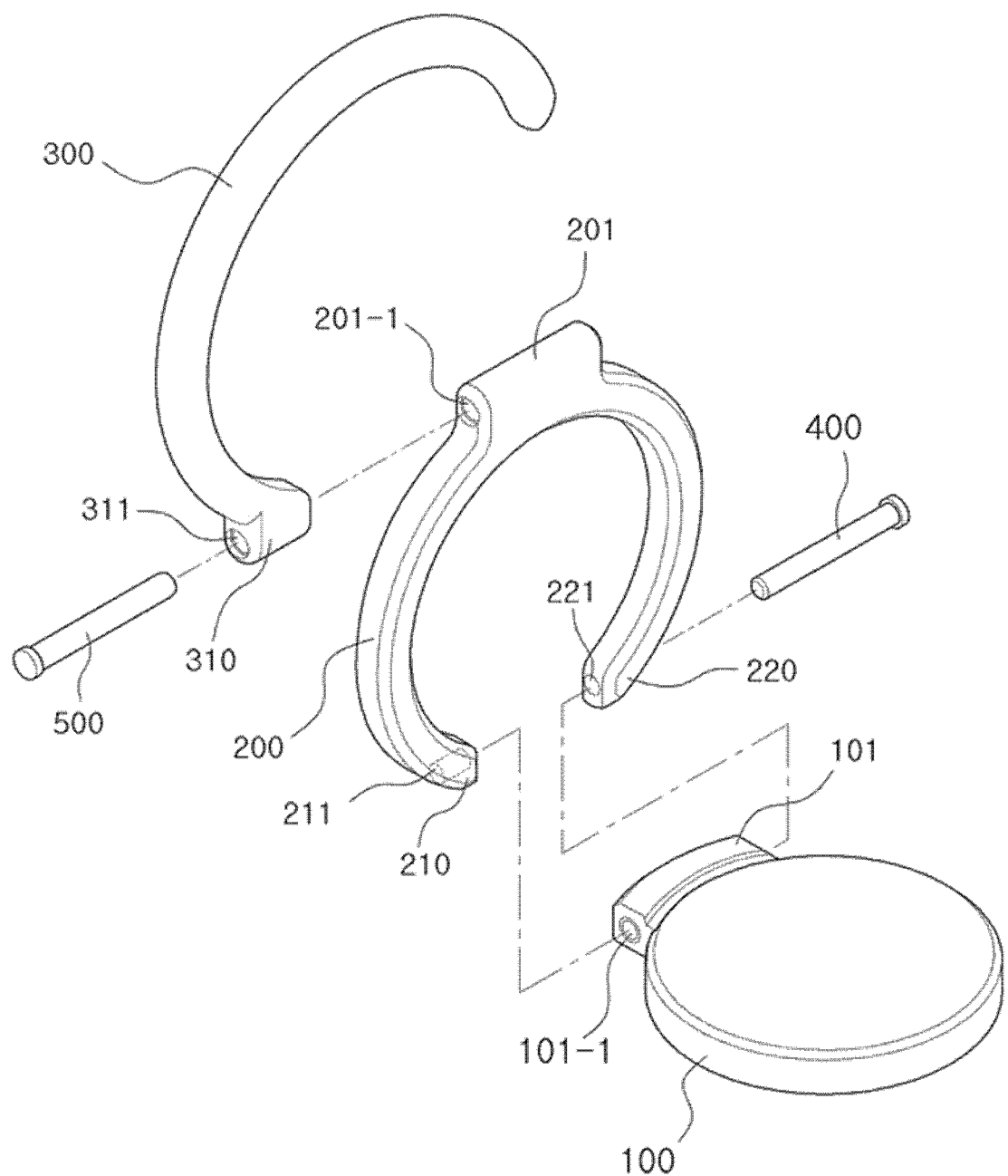
FIG. 26 is an exploded perspective view illustrating the main configuration of a mobile device holder according to a third embodiment of the present invention.
Figure 27:
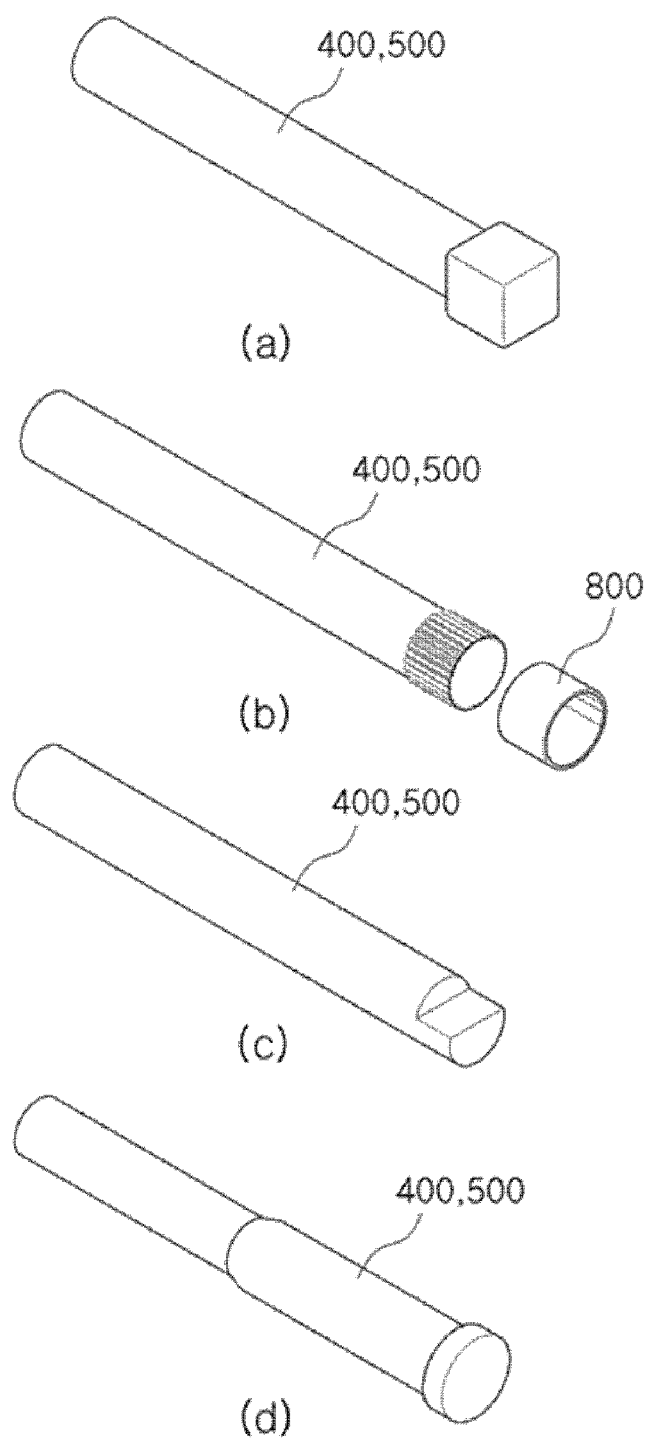
FIGS. 27A, 27B, 27C, and 27D are perspective views illustrating first and second horizontal hinge shafts of the mobile device holder according to the third embodiment of the present invention.

Referring to FIG. 26, a 1-1 assembly hole 211 and a 1-2 assembly hole 221 are formed through a 1-1 open end part 210 and a 1-2 open end part 220, respectively, corresponding to opposite ends of the first holder 200 being in contact with the first hinge piece 101.

In this case, a first horizontal hinge shaft 400 is provided and passes through the 1-1 assembly hole 211, the first insertion hole 101-1 of the first hinge piece 101, and the 1-2 assembly hole 221. The first holder 200 can rotate relative to the first horizontal hinge shaft 400. Furthermore, any one end of opposite ends of the first horizontal hinge shaft 400 is forcibly fitted to or is fixed to any one of the 1-1 assembly hole 211 and the 1-2 assembly hole 221.

A 2-1 insertion hole 311 is formed through a 2-1 open end part 310 corresponding to a side end of the second holder 300 being in contact with the second hinge piece 201. In addition, a second horizontal hinge shaft 500 inserted to the second insertion hole 201-1 of the second hinge piece 201 by passing through the 2-1 insertion hole 311 is provided. The second horizontal hinge shaft 500 is forcibly fitted into the 2-1 insertion hole 311 and is preferably rotated integrally with the second holder 300. Accordingly, the second holder 300 rotates relative to the second horizontal hinge shaft 500.

Referring to FIGS. 27A, 27B, 27C, 27D, and 28, each of the first and second horizontal hinge shafts 400 and 500 has a predetermined diameter and is manufactured in the shape of a rod extending to a predetermined length. In this case, the end part of each of the first and second horizontal hinge shafts 400 and 500 may be configured in a polygonal shape. Preferably, the end part thereof may be manufactured in the shape of a square having each length larger than the diameter of each of the first and second horizontal hinge shafts 400 and 500. Additionally, each of the first and second horizontal hinge shafts 400 and 500 may be manufactured to have a step such that a diameter of a first side thereof and a diameter of a second side thereof are different from each other.

Furthermore, the end part of each of the first and second horizontal hinge shafts 400 and 500 may have the same diameter as the diameter of each of the first and second horizontal hinge shafts 400 and 500; have the shape of a hemisphere having a portion of an upper or lower side of the end part removed or the shape of having the upper and lower sides thereof removed; and include multiple corrugations provided thereon by protruding therefrom.

In this case, the first horizontal hinge shaft 400 is required to be securely fixed to any one of the 1-1 open end part 210 or the 1-2 open end part 220, and the second horizontal hinge shaft 500 is required to be securely fixed to the 2-1 open end part 310. Accordingly, a third pressing friction tube 800 may be provided to cover a circumferential surface of the corrugations and may be forcibly fitted thereover, so that the first and second horizontal hinge shafts 400 and 500 can be fixed to the first and second holders 200 and 300, respectively.

Referring to FIG. 26, to form the 1-1 assembly hole 211 and the 1-2 assembly hole 221, the first holder 200 is required to be injection molded. In this case, the first horizontal hinge shaft 400 is required to be securely fitted to any one of the 1-1 assembly hole 211 and the 1-2 assembly hole 221, and thus is manufactured in the shape of a polygon. In this case, when round parts are formed at edge parts of the polygon or the 1-1 assembly hole 211 and the 1-2 assembly hole 221 have tolerances, gaps between the first horizontal hinge shaft 400 and the 1-1 assembly hole 211 and the 1-2 assembly hole 221 may occur. Such a problem can be solved by the change of the shape of an end part of the first horizontal hinge shaft 400 and by the third pressing friction tube 800.

Figure 28:
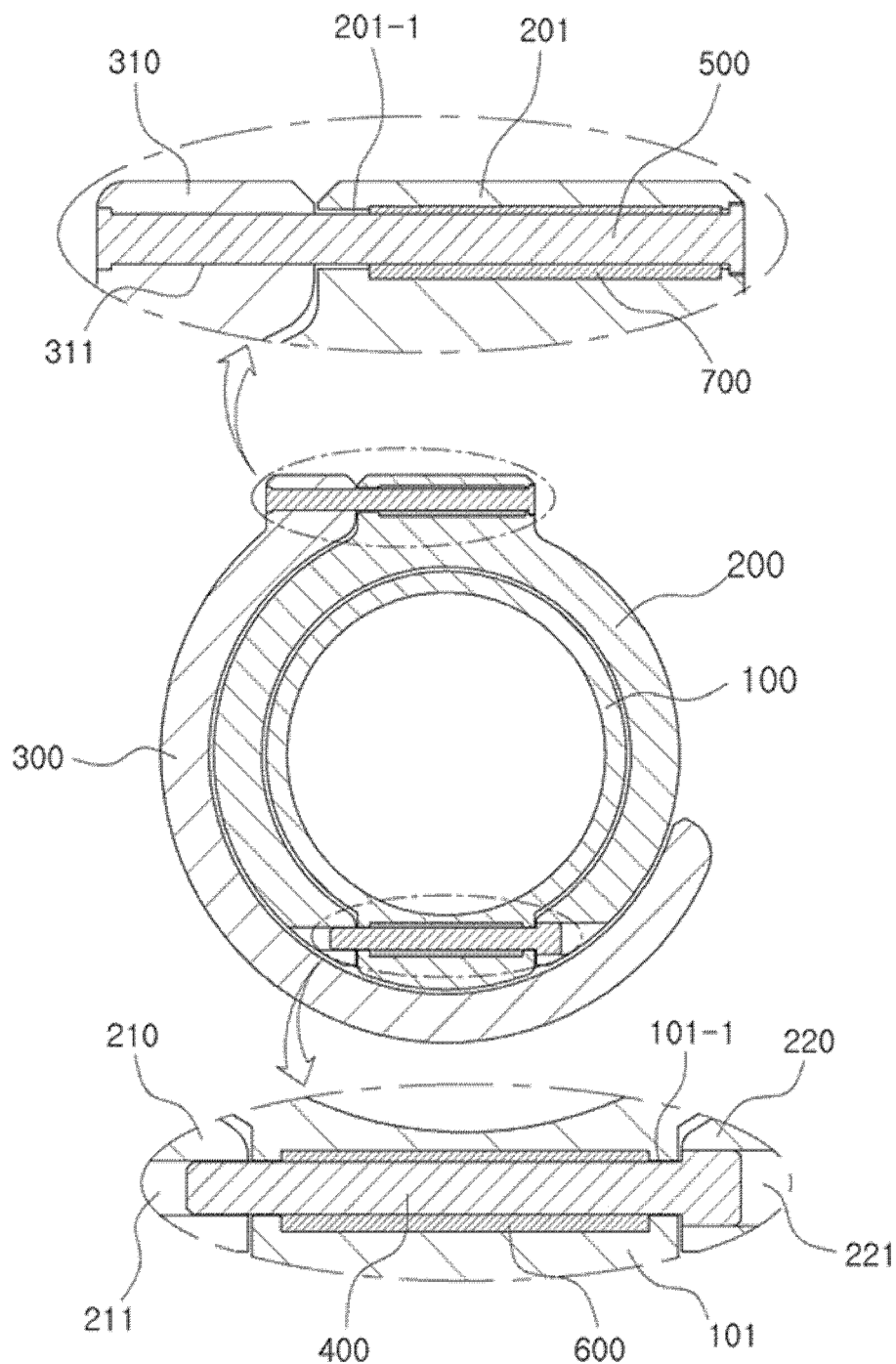
FIG. 28 shows a sectional view and a partially enlarged view illustrating the first and second horizontal hinge shafts according to the third embodiment of the present invention.

Referring to FIG. 28, when the first and second horizontal hinge shafts 400 and 500 are inserted into the first insertion hole 101-1 and the second insertion hole 201-1, respectively, a first pressing friction tube 600 and a second pressing friction tube 700 are provided to press side surfaces of the first and second horizontal hinge shafts 400 and 500, respectively, at predetermined pressures. That is, the first pressing friction tube 600 and the second pressing friction tube 700 include insertion holes therein such that the first and second horizontal hinge shafts 400 and 500 are forcibly fitted thereto and inserted thereinto. Accordingly, the first and second pressing friction tubes 600 and 700 apply rotation resistance to the first and second horizontal hinge shafts 400 and 500 such that the first holder 200 and the second holder 300 are rotated at a predetermined torque or more by being pulled or pressed.

The first and second pressing friction tubes 600 and 700 and the third pressing friction tube 800 may be manufactured of poly-oxy-methylene (POM). POM is a crystalline thermoplastic and is used in high friction parts since the shape of PCM is not changed even when a certain pressure is applied thereto. That is, friction between the first and second pressing friction tubes 600 and 700 and the first and second horizontal hinge shafts 400 and 500 is caused by the rotation of the first and second holders 200 and 300, so durability of the first and second pressing friction tubes 600 and 700 may decrease. However, when the first and second pressing friction tubes 600 and 700 are manufactured of the above-described material, such a problem can be solved.

Figure 29:
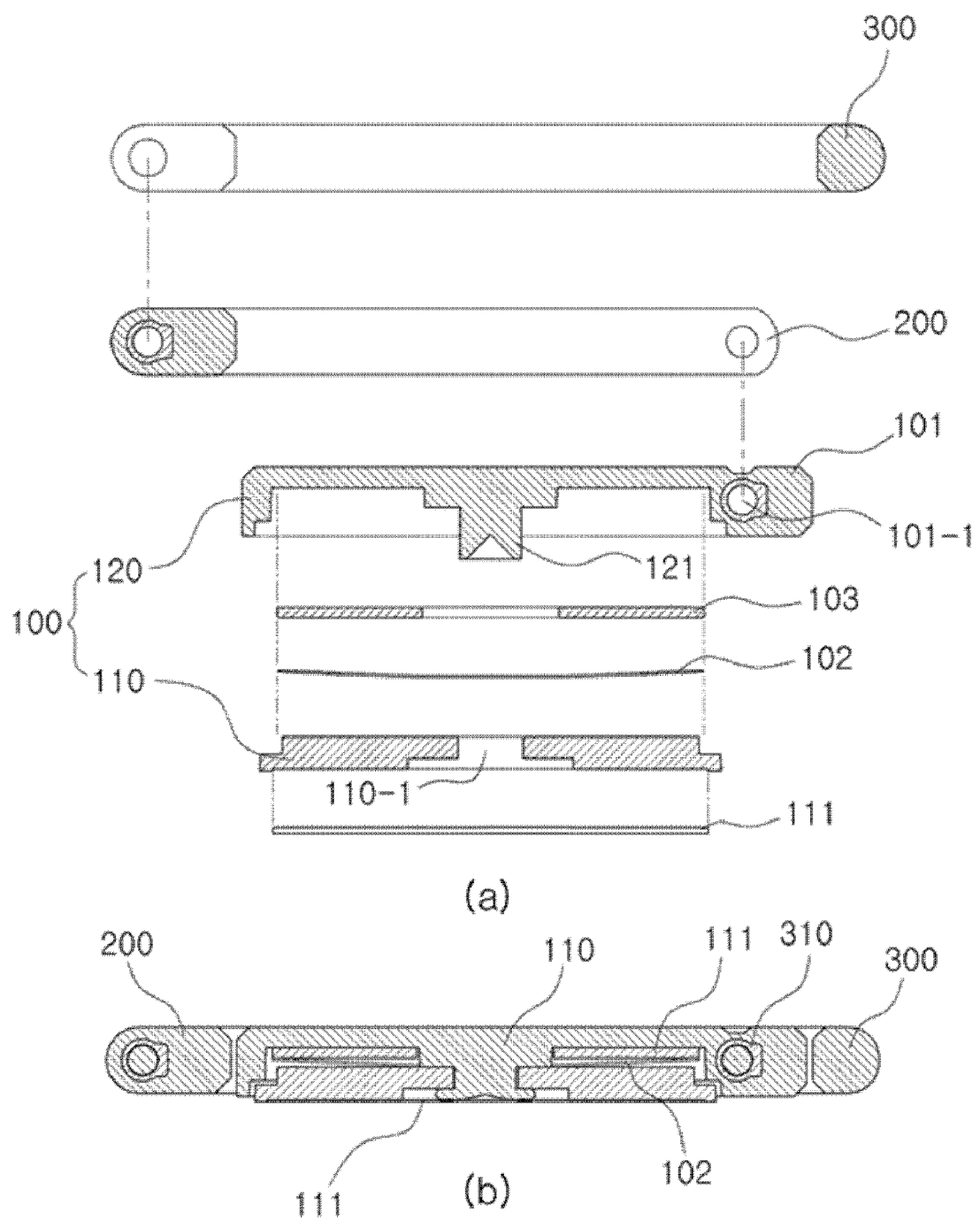
FIGS. 29A and 29B are sectional views illustrating combined relations of main components according to the third embodiment of the present invention.

Referring to FIGS. 29A and 29B, the base part 100 includes the base plate 110 and the horizontal rotating body 120. A first surface of the base plate 110 is fixed to the mobile device or a case of the mobile device, and a rotation hole 110-1 is provided by being formed through or being recessed from a center of the base plate 110.

The horizontal rotating body 120 has a shape open at a lower surface thereof to cover an upper surface of the base plate 110, and includes the first hinge piece 101 provided at an outer surface thereof by protruding therefrom. Furthermore, the horizontal rotating body 120 includes a rotation shaft 121 provided at a lower surface thereof, the rotation shaft being fitted into the rotation hole 110-1. Accordingly, the horizontal rotating body 120 is rotated by an external force in a rotation direction of the rotation shaft intersecting with a rotation shaft (a rotation direction) of the first holder 200 relative to the rotation shaft 121.

Referring to FIGS. 29A and 29B, a rotation resistant 102 may provided between the base plate 110 and the horizontal rotating body 120 to provide rotation resistance to the horizontal rotating body 120. The rotation resistant 102 presses or elastically supports each of an inner upper surface of the base plate 110 and an inner lower surface of the horizontal rotating body 120 to provide the rotation resistance to the horizontal rotating body 120. The rotation resistant 102 may be configured to be a plate spring.

Meanwhile, the adhesive part 111 having adhesive force may be provided on the first surface of the base plate 110 facing the mobile device or the case of the mobile device.

In addition, a magnetic part 103 made of a magnetic material may be provided between the base plate 110 and the horizontal rotating body 120. Accordingly, a second surface of the base plate 110 may be attached to an external device having magnetic force, and provides magnetic force greater than the magnetic force acting on the external device such that the base plate 110 can be easily attached to and removed from the external device.

The mobile device holder of the present invention manufactured in such a configuration is not limited to the above description, and can be embodied by making various modifications within the scope of the accompanying drawings.

What is claimed is:

1. A mobile device holder comprising:
   a base part (100) combined with a side of a mobile device or a case of the mobile device, and having a first hinge piece (101) provided at a side surface thereof by protruding therefrom; and
   a first holder (200) provided along a side surface of the base part (100), and each of opposite ends of which is connected to the hinge piece (101) such that the first holder is rotated,
   wherein a second hinge piece (201) is provided on a side surface of the first holder (200) by protruding therefrom, a second insertion hole (201-1) being provided in the second hinge piece by being formed therethrough.

2. The holder of claim 1, further comprising:
   a second holder (300) connected to the second hinge piece (201) to rotate in the same direction as rotation of the first holder (200) and surrounding an outer surface of the first holder (200).

3. The holder of claim 2, wherein a first end of the second holder (300) is connected to the second hinge piece (201) such that the second holder (300) surrounds only a portion of an outer surface of the first holder (200), and a second end of the second holder (300) is spaced apart from the second hinge piece (201).

4. The holder of claim 3, further comprising:
   a first horizontal hinge shaft (400) inserted into any one of a 1-1 open end part (210) and a 1-2 open end part (220) of the first holder (200) being in contact with the first hinge piece (101), and passing through the hinge piece (101), and
   a second horizontal hinge shaft (500) inserted into a 2-1 open end part (310) of the second holder (300) being in contact with the second hinge piece (201) and passing through the second hinge piece (201),
   wherein an end part of each of the first and second horizontal hinge shafts (400, 500) provided by extending to have a predetermined length is configured to be a polygon, or a first side and a second side thereof have a step to have diameters different from each other.

5. The holder of claim 3, further comprising:
   a first horizontal hinge shaft (400) inserted into any one of a 1-1 open end part (210) and a 1-2 open end part (220) of the first holder (200) being in contact with the first hinge piece (101), and passing through the hinge piece (101), and
   a second horizontal hinge shaft (500) inserted into a 2-1 open end part (310) of the second holder (300) being in contact with the second hinge piece (201) and passing through the second hinge piece (201),
   wherein an end part of each of the first and second horizontal hinge shafts (400, 500) provided by extending to have a predetermined length has a portion removed at an edge thereof or has a third pressing friction tube (800) covering multiple corrugations provided at a circumferential surface thereof.

6. The holder of claim 1, wherein the base part (100) comprises:
   a base plate (110) fixed to the mobile device and having a rotation hole (110-1) provided at a center thereof;
   a horizontal rotating body (120) having the first hinge piece (101) provided at a side thereof, and having a rotation shaft (121) provided on a lower surface thereof and fitted into the rotation hole (110-1) such that the horizontal rotating body (120) rotates in a rotation direction of the rotation shaft intersecting with a rotation shaft of the first holder (200).

7. The holder of claim 6, further comprising:
   a rotation resistant (102) provided between the base plate (110) and the horizontal rotating body (120), the rotation resistant providing rotation resistance to the horizontal rotating body (120) by pressing each of an inner upper surface of the base plate (110) and an inner lower surface of the horizontal rotating body (120).

8. The holder of claim 7, further comprising:
   an adhesive part (111) provided on a surface of the base plate (110) facing the mobile device and having adhesive force, and
   a magnetic part (103) provided between the base plate (110) and the horizontal rotating body (120) and made of a magnetic material such that the horizontal rotating body (120) is attached to or removed from an external device having magnetic force.

* * * * *